(12) United States Patent
Hooper et al.

(10) Patent No.: US 11,527,792 B2
(45) Date of Patent: Dec. 13, 2022

(54) BATTERY MODULE THERMAL MANAGEMENT

(71) Applicant: Generac Power Systems, Inc., Waukesha, WI (US)

(72) Inventors: Joel Hooper, Waukesha, WI (US); Peter Lex, Menomonee, WI (US); Tod Tesch, Oconomowoc, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 346 days.

(21) Appl. No.: 16/818,480

(22) Filed: Mar. 13, 2020

(65) Prior Publication Data

US 2020/0321670 A1   Oct. 8, 2020

Related U.S. Application Data

(60) Provisional application No. 62/926,124, filed on Oct. 25, 2019, provisional application No. 62/983,225, (Continued)

(51) Int. Cl.
*H01M 10/6555* (2014.01)
*H01M 10/613* (2014.01)
*H01M 50/35* (2021.01)

(52) U.S. Cl.
CPC ..... *H01M 10/6555* (2015.04); *H01M 10/613* (2015.04); *H01M 50/35* (2021.01)

(58) Field of Classification Search
CPC ........... H01M 10/6555; H01M 10/613; H01M 50/35; H01M 10/643; H01M 10/653; H01M 10/6551; H01M 50/358; Y02E 60/10
See application file for complete search history.

(56) References Cited

U.S. PATENT DOCUMENTS

| 6,225,788 B1 | 5/2001 | Kouzu et al. |
| 6,278,259 B1 | 8/2001 | Kimoto et al. |

(Continued)

FOREIGN PATENT DOCUMENTS

| CN | 102511091 A | * | 6/2012 | ........ H01M 10/5057 |
| CN | 206322736 U | * | 7/2017 | ............. Y02E 60/10 |

(Continued)

OTHER PUBLICATIONS

International Search Report and Written Opinion for Application No. PCT/US2020/022718 dated Jul. 27, 2020.

(Continued)

*Primary Examiner* — Kaity V Chandler
(74) *Attorney, Agent, or Firm* — Merchant & Gould P.C.

(57) ABSTRACT

A battery module includes features to optimize cooling while providing electrical isolation and cell gas-venting channels. The battery module can include the integration of a heatsink in order to improve thermal performance. Thermally conductive pads can be provided to create an electrically isolated interface between a plurality of series-connected battery-cell lead plates, at different potentials, and the heatsink. Optimization, by stacking thin and thick thermally conductive pads, allows for creation of gas-venting channels along the positive cell terminal locations. In some arrangements, a plurality of fluid paths are disposed between the inlet and the outlet of the battery module to provide heat convective airflow through the battery module.

15 Claims, 21 Drawing Sheets

Related U.S. Application Data filed on Feb. 28, 2020, provisional application No. 62/818,618, filed on Mar. 14, 2019, provisional application No. 62/825,170, filed on Mar. 28, 2019.

(56) References Cited

U.S. PATENT DOCUMENTS

| | | |
|---|---|---|
| 6,304,057 B1 | 10/2001 | Hamada et al. |
| 6,340,311 B1 | 1/2002 | Hamada et al. |
| 6,433,509 B2 | 8/2002 | Kobayashi et al. |
| 6,455,190 B1 | 9/2002 | Inoue et al. |
| 6,486,637 B1 | 11/2002 | Nakanishi et al. |
| 6,495,991 B2 | 12/2002 | Yuasa et al. |
| 6,504,342 B2 | 1/2003 | Inui et al. |
| 6,517,966 B1 | 2/2003 | Marukawa et al. |
| 6,555,264 B1 | 4/2003 | Hamada et al. |
| 6,569,561 B1 | 5/2003 | Kimura et al. |
| 6,602,636 B2 | 8/2003 | Taniguchi et al. |
| 6,611,128 B2 | 8/2003 | Minamiura et al. |
| 6,709,783 B2 | 3/2004 | Ogata et al. |
| 6,759,832 B2 | 7/2004 | Minamiura et al. |
| 6,780,538 B2 | 8/2004 | Hamada et al. |
| 6,811,921 B2 | 11/2004 | Dansui et al. |
| 6,818,343 B1 | 11/2004 | Kimoto et al. |
| 6,819,085 B2 | 11/2004 | Kimoto |
| 6,903,534 B2 | 6/2005 | Minamiura |
| 6,914,414 B2 | 7/2005 | Hamada et al. |
| 6,939,642 B2 | 9/2005 | Asahina et al. |
| 6,953,638 B2 | 10/2005 | Inui et al. |
| 7,090,945 B2 | 8/2006 | Asahina et al. |
| 7,189,474 B2 | 3/2007 | Hamada et al. |
| 7,291,421 B2 | 11/2007 | Kimura et al. |
| 7,297,438 B2 | 11/2007 | Kimoto |
| 7,319,305 B2 | 1/2008 | Kimoto et al. |
| 7,332,244 B2 | 2/2008 | Uemoto et al. |
| 7,351,493 B2 | 4/2008 | Uemoto et al. |
| 7,375,498 B2 | 5/2008 | Yamamoto |
| 7,410,722 B2 | 8/2008 | Iwamura et al. |
| 7,550,228 B2 | 6/2009 | Izawa |
| 7,740,978 B2 | 6/2010 | Hamada et al. |
| 7,759,000 B2 | 7/2010 | Asahina et al. |
| 7,884,577 B2 | 2/2011 | Tsutsumi et al. |
| 7,914,923 B2 | 3/2011 | Asahina et al. |
| 7,989,102 B2 | 8/2011 | Fukusako et al. |
| 8,062,785 B2 | 11/2011 | Kishii et al. |
| 8,124,262 B2 | 2/2012 | Okada et al. |
| 8,124,270 B2 | 2/2012 | Asahina et al. |
| 8,142,919 B2 | 3/2012 | Kawai et al. |
| 8,163,419 B2 | 4/2012 | Marukawa et al. |
| 8,163,420 B2 | 4/2012 | Okada et al. |
| 8,173,286 B2 | 5/2012 | Marukawa et al. |
| 8,178,229 B2 | 5/2012 | Marukawa et al. |
| 8,232,469 B2 | 7/2012 | Sekimoto et al. |
| 8,298,700 B2 | 10/2012 | Asahina et al. |
| 8,309,250 B2 | 11/2012 | Nishino et al. |
| 8,322,476 B2 | 12/2012 | Komaki |
| 8,323,812 B2 | 12/2012 | Nishino et al. |
| 8,329,330 B2 | 12/2012 | Okada |
| 8,338,016 B2 | 12/2012 | Marukawa et al. |
| 8,399,112 B2 | 3/2013 | Yasui et al. |
| 8,409,743 B2 | 4/2013 | Okada et al. |
| 8,435,664 B2 | 5/2013 | Saito et al. |
| 8,475,952 B2 | 7/2013 | Yasui et al. |
| 8,487,631 B2 | 7/2013 | Yuasa et al. |
| 8,507,121 B2 | 8/2013 | Saito et al. |
| 8,507,122 B2 | 8/2013 | Saito et al. |
| 8,574,747 B2 | 11/2013 | Okada et al. |
| 8,592,067 B2 | 11/2013 | Yokoyama et al. |
| 8,592,076 B2 | 11/2013 | Sugita et al. |
| 8,598,884 B2 | 12/2013 | Yano et al. |
| 8,674,703 B2 | 3/2014 | Yano et al. |
| 8,701,810 B2 | 4/2014 | Marukawa et al. |
| 8,748,019 B2 | 6/2014 | Okada |
| 8,809,743 B2 | 8/2014 | Suzuki et al. |
| 8,835,032 B2 | 9/2014 | Takasaki et al. |
| 8,846,235 B2 | 9/2014 | Yokoyama et al. |
| 8,890,483 B2 | 11/2014 | Nakatsuji et al. |
| 8,993,147 B2 | 3/2015 | An et al. |
| 8,994,300 B2 | 3/2015 | Ohkura |
| 8,999,538 B2 | 4/2015 | Fuhr et al. |
| 9,024,572 B2 | 5/2015 | Nishihara et al. |
| 9,063,200 B2 | 6/2015 | Matsuura |
| 9,088,031 B2 | 7/2015 | Shimizu et al. |
| 9,178,380 B2 | 11/2015 | Kawai et al. |
| 9,184,426 B2 | 11/2015 | Yasui et al. |
| 9,184,427 B2* | 11/2015 | Chuang ............... H01M 10/643 |
| 9,203,127 B2 | 12/2015 | Hioki et al. |
| 9,246,147 B2 | 1/2016 | Kishii et al. |
| 9,257,684 B2 | 2/2016 | Hamada et al. |
| 9,293,794 B2 | 3/2016 | Fujikawa et al. |
| 9,296,348 B2 | 3/2016 | Yano |
| 9,307,630 B2 | 4/2016 | Nagamatsu et al. |
| 9,437,854 B2 | 9/2016 | Shimizu et al. |
| 9,548,477 B2 | 1/2017 | Asaida et al. |
| 9,564,619 B2 | 2/2017 | Motokawa et al. |
| 9,680,138 B2 | 6/2017 | Ejima |
| 9,712,897 B2 | 7/2017 | Hirata |
| 9,735,406 B2 | 8/2017 | Nishino et al. |
| 9,786,879 B2 | 10/2017 | Takasaki |
| 9,800,066 B2 | 10/2017 | Toya et al. |
| 9,812,694 B2 | 11/2017 | Takano et al. |
| 10,003,055 B2 | 6/2018 | Shimizu et al. |
| 10,003,107 B2 | 6/2018 | Nishihara |
| 10,020,474 B2 | 7/2018 | Hoshi et al. |
| 10,062,938 B2 | 8/2018 | Hada et al. |
| 10,085,359 B2 | 9/2018 | Kurosaki et al. |
| 10,263,229 B2 | 4/2019 | Motokawa et al. |
| 10,276,843 B2 | 4/2019 | Okutani et al. |
| 10,297,813 B2 | 5/2019 | Takano et al. |
| 10,347,883 B2 | 7/2019 | Takasaki et al. |
| 10,637,034 B2 | 4/2020 | Takeda et al. |
| 10,644,287 B2 | 5/2020 | Shimizu et al. |
| 2005/0026014 A1 | 2/2005 | Fogaing et al. |
| 2010/0233564 A1* | 9/2010 | Haltiner, Jr. ........ H01M 8/2465 429/456 |
| 2012/0034507 A1* | 2/2012 | Harada .................. B60L 58/26 429/120 |
| 2014/0106199 A1* | 4/2014 | Meintschel ....... H01M 10/6556 429/120 |
| 2015/0037626 A1* | 2/2015 | Malcolm ............. H01M 10/613 429/90 |
| 2015/0037648 A1* | 2/2015 | Nguyen ............. H01M 10/613 429/120 |
| 2015/0064514 A1 | 3/2015 | Wu et al. |
| 2016/0254578 A1* | 9/2016 | Liu .................... H01M 50/289 429/120 |
| 2018/0175464 A1* | 6/2018 | Kim .................... H01M 50/271 |
| 2019/0006642 A1 | 1/2019 | Sakaguchi et al. |
| 2019/0013556 A1 | 1/2019 | Sakaguchi et al. |
| 2019/0044200 A1 | 2/2019 | Motoyoshi et al. |
| 2019/0051953 A1 | 2/2019 | Sakaguchi et al. |
| 2019/0181399 A1 | 6/2019 | Kaga et al. |
| 2019/0263279 A1 | 8/2019 | Kyojo et al. |
| 2019/0267686 A1 | 8/2019 | Shimizu et al. |
| 2019/0273277 A1 | 9/2019 | Wakimoto et al. |

FOREIGN PATENT DOCUMENTS

| | | | | |
|---|---|---|---|---|
| CN | 206349436 U | * | 7/2017 | ............. Y02E 60/10 |
| CN | 107134557 A | * | 9/2017 | ........ H01M 10/4207 |
| CN | 206639829 U | * | 11/2017 | ............. Y02E 60/10 |
| CN | 206992203 U | * | 2/2018 | ............. Y02E 60/10 |
| CN | 207587825 U | * | 7/2018 | ........ H01M 10/4207 |
| CN | 207677016 U | * | 7/2018 | ............. Y02E 60/10 |
| CN | 207800678 U | * | 8/2018 | ............. Y02E 60/10 |
| WO | 201164956 | | 6/2011 | |

OTHER PUBLICATIONS

Invitation to Pay Extra Search Fees and Partial Search Opinion dated Jun. 5, 2020.

* cited by examiner

BATTERY MODULE THERMAL MANAGEMENT

RELATED APPLICATIONS

This application claims priority to U.S. Provisional Application No. 62/818,618, filed Mar. 14, 2019, U.S. Provisional Application No. 62/825,170, filed Mar. 28, 2019, U.S. Provisional Application No. 62/926,124, filed Oct. 25, 2019, and U.S. Provisional Application No. 62/983,225, filed Feb. 28, 2020, the disclosures of which are hereby incorporated by reference in their entireties.

BACKGROUND

Cooling battery products is critical for their operation, safety and cycle life. Many solutions offer to cool the sides of the battery cells and not on the conducting ends where most of the heat is rejected. Pulling heat from the ends of the cells (lead plates) can be an effective means but is more difficult because of the exposure to cell voltage and the need to maintain gas-venting pathways. Accordingly, improvements are desired.

SUMMARY

This disclosure is directed to systems and methods to optimize cooling while providing electrical isolation and cell gas-venting channels in a battery module. In one aspect, the disclosure involves the integration of a heatsink (with or without an integrated cold plate) with a battery module in order to improve thermal performance. Thermally conductive pads create an electrically isolated interface between a plurality of series-connected battery-cell lead plates, at different potentials, and the heatsink. Optimization, by stacking thin and thick thermally conductive pads, allows for creation of gas-venting channels along the positive cell terminal locations. The heatsink, and optionally a cold plate, aids in cooling thermal material in the event of cell gas venting.

In one example, a battery module includes an enclosure including first and second heat sink covers, each including features for dissipating heat and a plurality of battery cells positioned between the first and second heat sink covers, and being arranged with alternating polarity such that positive terminals of at least some of the battery cells face the first heat sink cover and such that positive terminals of at least some others of the battery cells face the second heat sink cover. The battery module can further include one or more first lead plates positioned between the first heat sink cover and the plurality of battery cells, the one or more first lead plates being electrically connected with at least some of the battery cells. The battery module can further include a first thermally conductive layer extending between and contacting the one or more first lead plates and the first heat sink cover, the first thermally conductive layer being shaped to at least partially define a gas vent channel in fluid communication with the positive terminals of at least some of the plurality of battery cells.

In some examples, the first thermally conductive layer includes a first thermally conductive pad in contact with the first heat sink cover and includes a second thermally conductive pad in contact with the first thermally conductive pad and the one or more first lead plates.

In some examples, the first thermally conductive pad is adhered to the first heat sink cover and the second thermally conductive pad is adhered to the one or more first lead plates.

In some examples, the first thermally conductive pad is formed as a solid layer.

In some examples, the second thermally conductive pad defines the gas-venting channel.

In some examples, the second thermally conductive pad has a thickness that is greater than a thickness of the first thermally conductive pad.

In some examples, the first and second heat sink covers include fins.

In some examples, the battery module can further include one or more second lead plates positioned between the second heat sink cover and the plurality of battery cells, the one or more second lead plates being electrically connected with at least some of the battery cells and can include a second thermally conductive layer extending between and contacting the one or more second lead plates and the second heat sink cover, the second thermally conductive layer being shaped to at least partially define a gas vent channel in fluid communication with the positive terminals of at least some of the plurality of battery cells.

In some examples, the first and second thermally conductive layers each include a first thermally conductive pad in contact with a second thermally conductive pad.

In some examples, the first thermally conductive pad of the first thermally conductive layer is in contact with the first heat sink cover and the first thermally conductive pad of the second thermally conductive later is in contact with the second heat sink cover.

In some examples, the second thermally conductive pad of the first thermally conductive layer is in contact with the one or more first lead plates and the second thermally conductive pad of the second thermally conductive later is in contact with the one or more second lead plates.

In some examples, the first thermally conductive pads of the first and second thermally conductive layers are respectively adhered to the first and second heat sink covers and wherein the second thermally conductive pads of the first and second thermally conductive layers are respectively adhered the one or more first and second lead plates.

In some examples, the first thermally conductive pads are formed as a solid layer.

In some examples, the second thermally conductive pads define the gas-venting channel.

In some examples, the second thermally conductive pads have a thickness that is greater than a thickness of the first thermally conductive pads.

A battery module with simple construction and superior thermal performance comprises an array of individual battery cells with a network of parallel and series electrical connections, and one or more structural interfaces that mechanically support and protect the cells while efficiently transferring heat to the surface of the module.

An energy storage module can include a shell having inner faces and outer faces, the inner faces including ribs to support battery cells in retentive thermal contact, and outer faces having cooling structures for transferring heat to surrounding fluid.

In some examples, the shell is formed in a clam shell shape.

In some examples, the cooling structures comprise fins.

In some examples, the fins comprise at least one of interrupted fins, linear fins, and textured fins.

In some examples, the shell comprises a pair of interface plates coupled by a hinge.

In some examples, the ribs comprise sockets having sides to thermally couple to batteries.

In some examples, the module further includes thermally conductive metallic pins thermally coupled to and extending outward from the shells.

In some examples, the metallic pins are thermally isolated from supported batteries by the shell.

In some examples, the metallic pins are overmolded directly into the shell.

In some examples, the module further includes multiple battery cells thermally coupled to the ribs.

In some examples, the module further includes a network of parallel and series coupled electrical connections positioned to couple to the battery cells.

A battery device includes an enclosure having an inlet and an outlet. A plurality of battery modules are supported by the enclosure between the inlet and the outlet. A plurality of fluid paths are disposed between the inlet and the outlet positioned to provide heat convective airflow across the battery modules. A fan may be supported by the enclosure to cause the heat convective airflow. A battery module may include fins to conduct heat away from the batteries in the module. The battery terminals may be potted with a thermally conductive potting material.

A battery device can include an enclosure having an inlet and an outlet, a plurality of battery modules supported by the enclosure between the inlet and the outlet, a plurality of fluid paths disposed between the inlet and the outlet positioned to provide heat convective airflow across the battery modules, and a fan supported by the enclosure to cause the heat convective airflow.

In some examples, the fan is supported proximate the outlet to cause the fluid to flow into the inlet from ambient and out of the outlet to ambient.

In some examples, the inlet comprises at least one of a screen, baffles, and louvers to prevent ingress of water.

In some examples, the battery modules comprise fins applied to external faces of the battery modules to facilitate convective cooling by the fluid flow.

In some examples, the fluid comprises air.

In some examples, at least one of the plurality of battery modules include a case, multiple spaced apart batteries supported within the case, interconnects electrically coupling anodes and cathodes of the batteries, and a potting material encapsulating the interconnects, anodes, and cathodes.

In some examples, the case comprises two ends, each end including a vent to allow airflow between the spaced apart batteries.

In some examples, the vents are protected by one or more of screens, baffles, and filters.

In some examples, the potting material is supported by the case and comprises a flowable thermal adhesive.

In some examples, the potting material comprises an electrically protective resin that is formed by spraying or dipping.

In some examples, at least one of the plurality of battery modules includes a case, multiple spaced apart batteries supported within the case, interconnects electrically coupling anodes and cathodes of the batteries, and a thermal layer in close thermal communication with the batteries and the case.

In some examples, the case comprises a plurality of heat conductive fins thermally fixed to an outside portion of the case.

In some examples, the fins are rounded at an end opposite the case.

In some examples, the fins are compliant metallic fins.

A battery module can include a case, multiple spaced apart batteries supported within the case, interconnects electrically coupling anodes and cathodes of the batteries; and a thermal layer in close thermal communication with the batteries and the case.

In some examples, the case further includes a plurality of heat conductive fins thermally fixed to an outside portion of the case.

In some examples, the fins are rounded at an end opposite the case.

In some examples, the fins are compliant metallic fins.

A battery module can include a case, multiple spaced apart batteries supported within the case, interconnects electrically coupling anodes and cathodes of the batteries; and a potting material encapsulating the interconnects, anodes, and cathodes.

In some examples, the case includes two ends, each end including a vent to allow airflow between the spaced apart batteries.

In some examples, the vents are protected by one or more of screens, baffles, and filters.

In some examples, the potting material is supported by the case and comprises a flowable thermal adhesive.

In some examples, the potting material comprises an electrically protective resin that is formed by spraying or dipping.

In some examples, the cells are assembled in a dense array with parallel axes and coincident faces, such that as a whole they form a planar slab.

In some examples, the design enables a simple module with high thermal performance that is entirely sealed to prevent ingress of water, dust, humidity, or other harmful materials.

A smart battery device has a simple construction and superior thermal performance. The smart battery device includes an enclosure containing a plurality of removable battery modules. The modules contain and protect a plurality of battery cells connected by electrically conductive interconnects, such as metallic interconnects. The modules may be designed with features that enhance the transmission of heat that is generated in the cells and interconnects to one or more module surfaces. The enclosure includes an arrangement of channels and interface surfaces designed to efficiently and evenly convey heat from the modules to a passing flow of air, which is used to reject the heat from the battery product.

In one embodiment, the enclosure features inlet and outlet plenums which divide and apportion the air substantially evenly among the battery modules by management of the fluidic resistance throughout the fluidic circuit. A fan draws air through the assembly of modules, and exhausts it out of the smart battery enclosure.

In some embodiments, the battery modules feature openings on one or more faces, permitting the flow of air to pass through and among the battery cells themselves, stripping generated heat from the cells by forced convection. The ends of the cells and associated metallic interconnects may be protected from the passing flow of air by pottant or resin applied to either end of the cells.

In other embodiments, the battery modules are substantially sealed to protect the cells, and heat generated in each cell is conducted axially outward along the length of the cell, further conducted through a thermally conductive, electrically insulating adhesive into side plates, and further convected to a passing flow of air with the help of fins or similar thermally conductive features.

DETAILED DESCRIPTION

Figure 1:
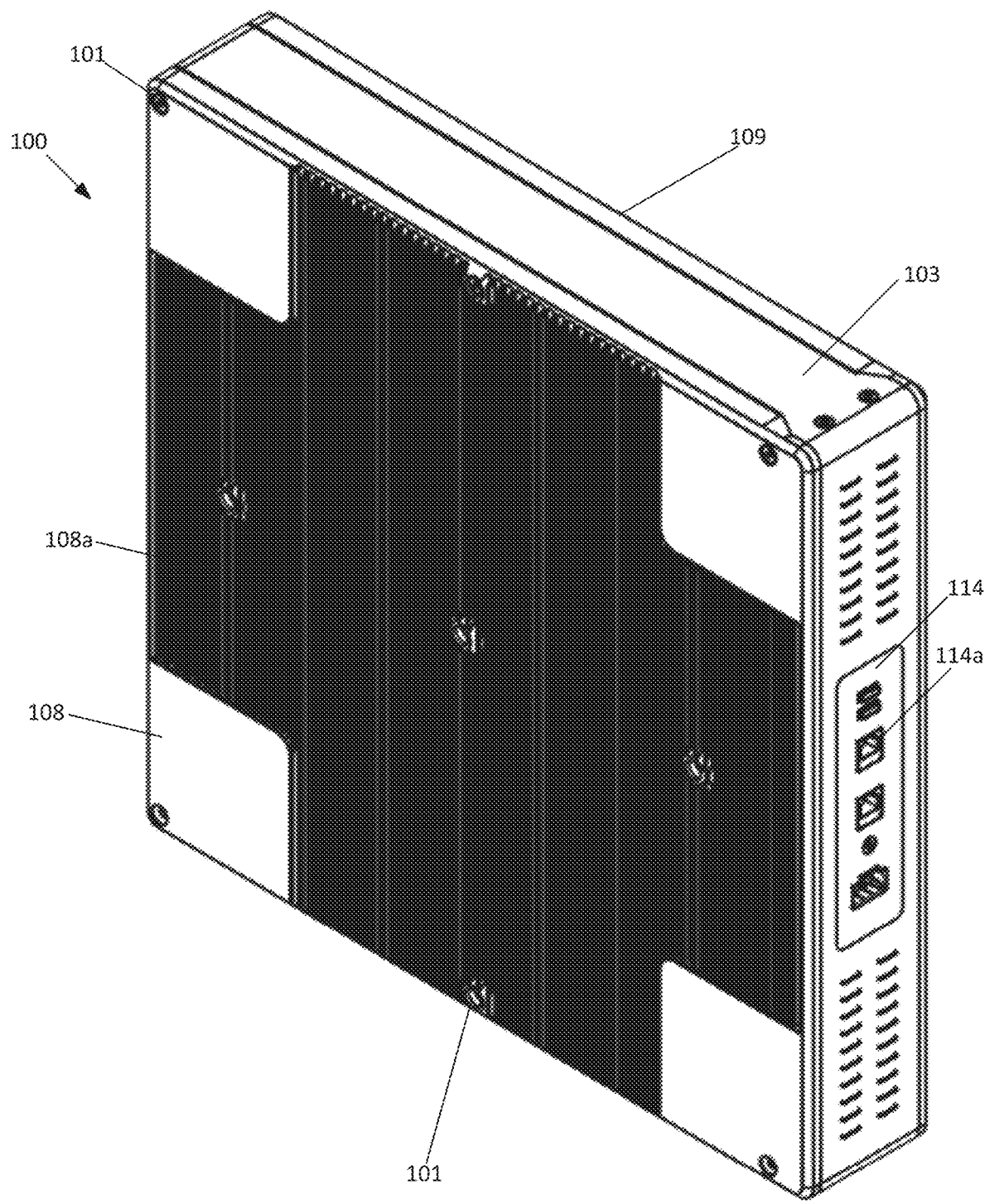
FIG. 1 is a perspective view of an example battery module having features in accordance with the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The importance of distributed energy storage is increasing rapidly, due to the growth of solar and other distributed energy technologies, which have become a significant source of energy on electric grids worldwide. As energy storage becomes a key part of grid technology, cost-effective battery storage that is capable of performing multiple charge/discharge cycles per day is becoming increasingly important. Further, as millions of storage units are deployed, it will be valuable to reduce the cost and complexity of these systems, particularly relating to cooling systems and moving parts.

Electric grids and the use of distributed energy storage devices would benefit from a simple, cost-effective modular energy storage battery product that is fast and simple to install, physically compact, and capable of delivering multiple charge/discharge cycles per day, without the complexity of liquid cooling or other special techniques.

In one aspect, the disclosure includes systems and methods providing a way to maintain operational-range cell temperatures in a battery module 100 while maintaining the safety features of the battery module 100. For example, and as explained in further detail below, the battery module 100 includes a plurality of cells 102, such as cylindrical 18650 or 21700-type lithium cells, provides a cooling pathway from cells 102 within the battery module 100 while simultaneously defining gas venting pathways of the cells 102.

To cool a battery module 100 having cylindrical cells 102, heat must be removed from the outer surfaces of the cells 102, for example the circumferential outer surface 102a and/or the end surfaces 102b of the cells 102. In some configurations and applications, heat conducts more readily from the end surfaces 102b, which includes the positive and negative terminals of the cells 102, in comparison to the circumferential outer surface 102a of a cell. As the ends 102b of the cells 102 are electrically active, a thermally conductive and electrically isolated interface material can be utilized such that contact to a grounded heatsink, for example a battery module cover 108, can be established.

Figure 4:
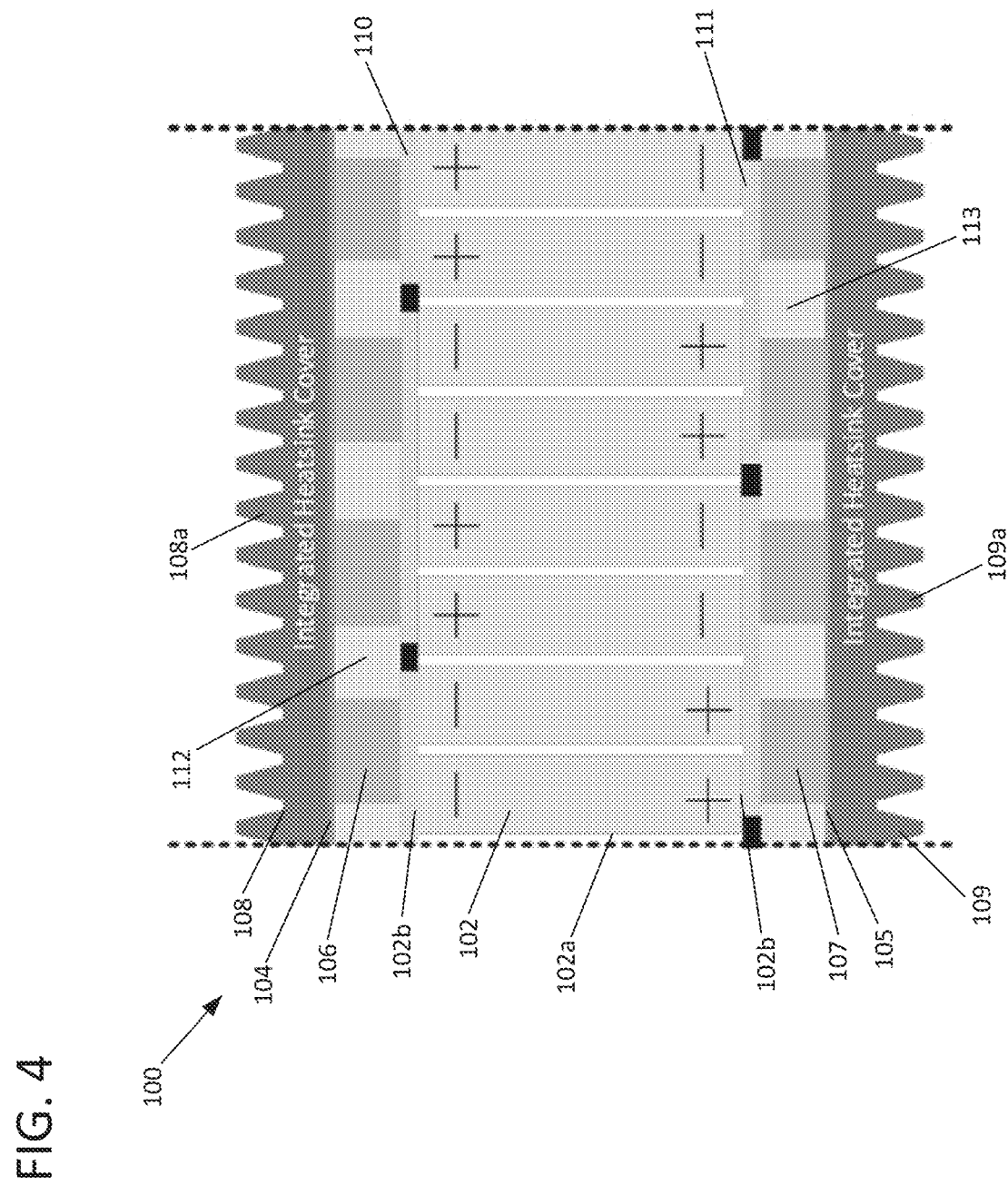
FIG. 4 is a schematic cross-sectional side view of the battery module of FIG. 1.
Figure 22:
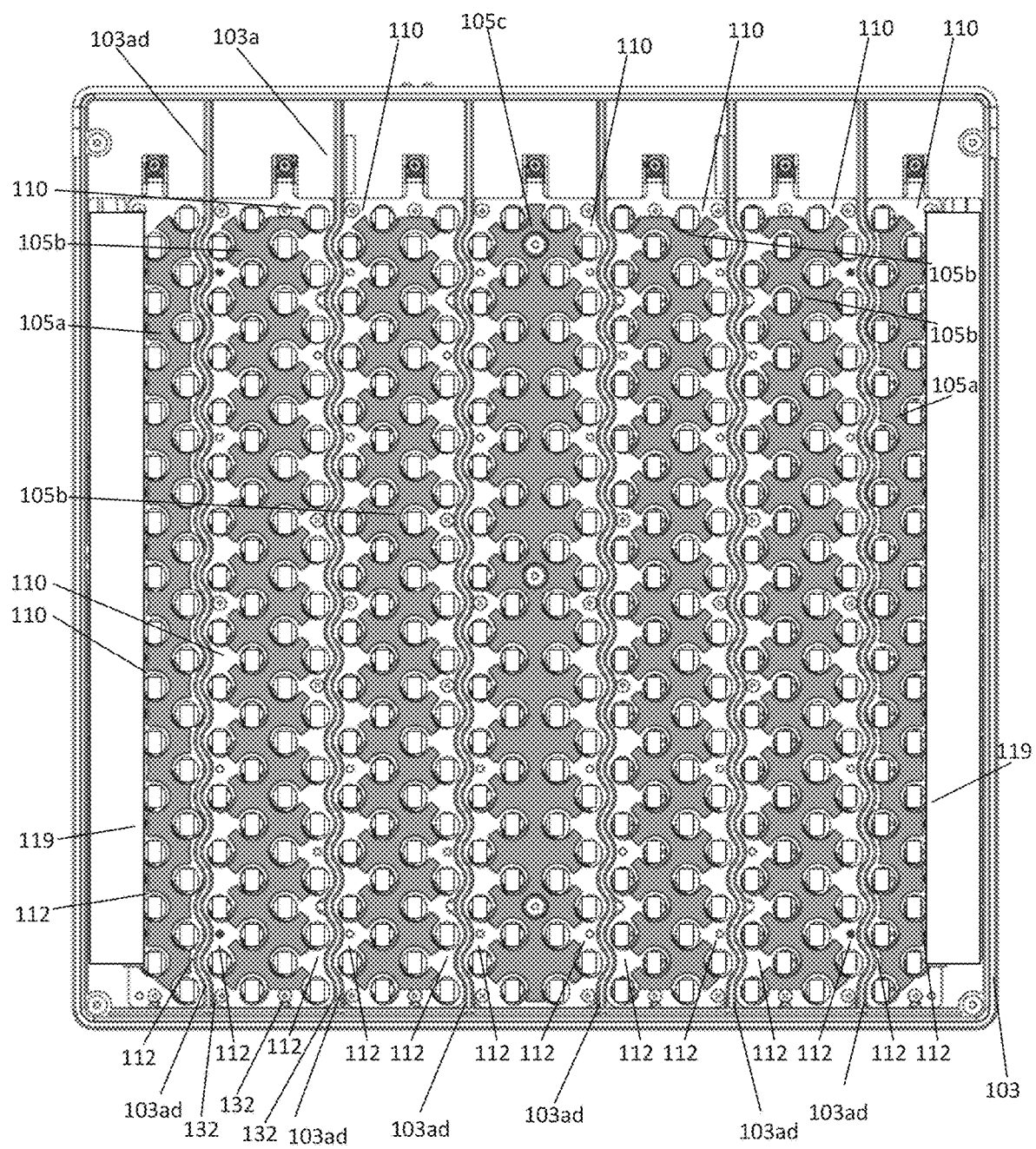
FIG. 22 is a top view of the battery module of FIG. 1, with the top cover and first thermally conductive pad removed such that the second thermally conductive pads shown in FIG. 11 can be viewed in an installed condition.
Figure 23:
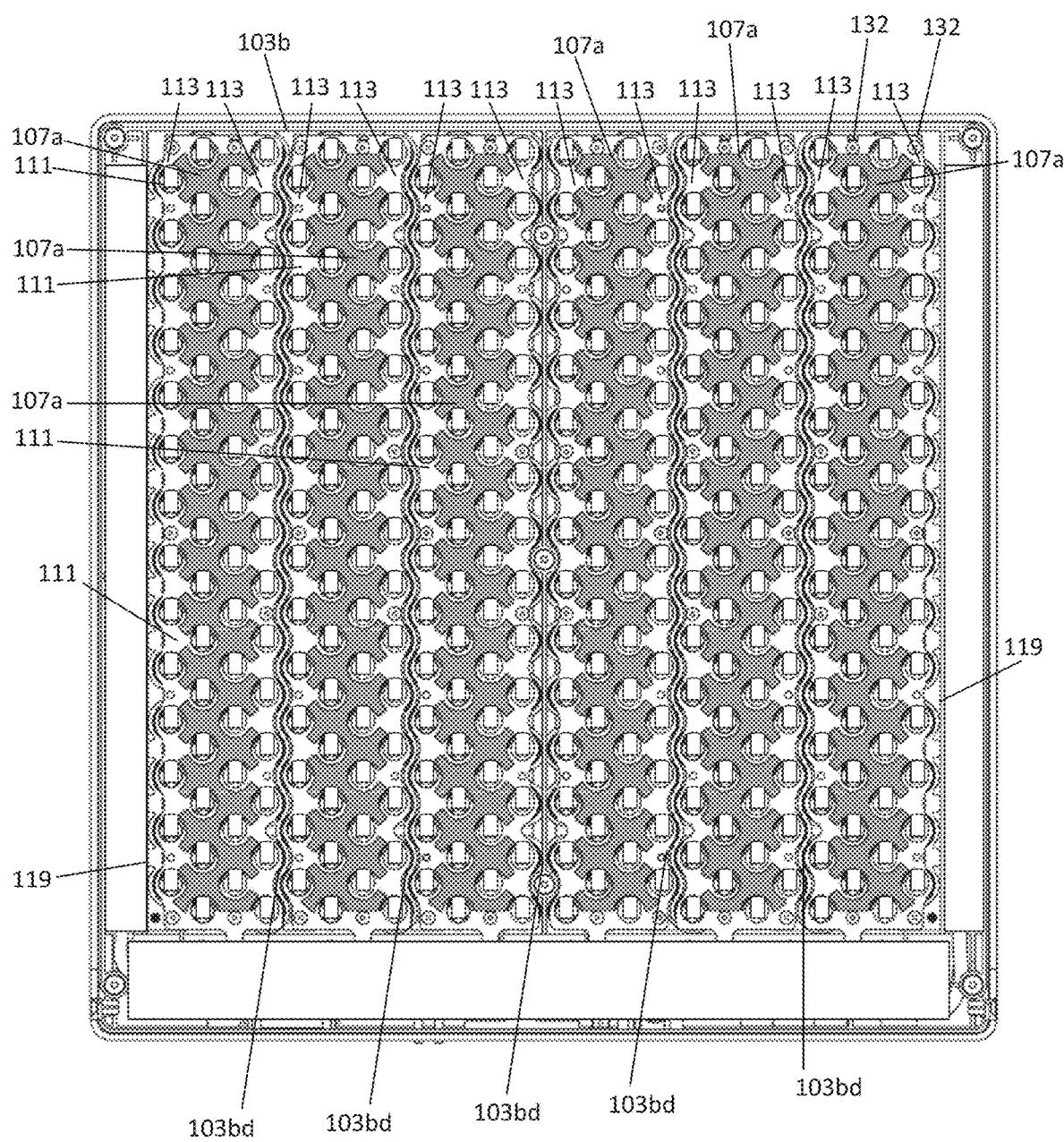
FIG. 23 is a bottom view of the battery module of FIG. 1, with the bottom cover and a first thermally conductive pad removed such that the second thermally conductive pads shown in FIG. 12 can be viewed in an installed condition.

In the present disclosure, and as can be seen at FIGS. 4, 22, and 23, lead plates 110, 111 are used to electrically connect groups of cells 102 at each of the respective ends 102b of the cells 102. The lead plates 110, 111 can act as a thermal connection point to the cover 108 acting as a heat sink. However, the lead plates 110, 111 are electrically active so they must also be electrically isolated from the cover 108. To provide an electrically isolated, thermally conductive connection between the lead plates 110, 111 and the cover 108 of the battery module 100, the present disclosure utilizes multiple layers 104, 105, 106, 107 of thermal conductive, electrically isolating material that create channels 112, 113 for safely venting cell gases to the outside of the module 100 while pulling heat from the lead plates 110, 111, as is discussed in more detail below.

Referring to FIGS. 1 to 4, an example battery module 100 is presented. The battery module 100 may also be referred to as a smart battery or a battery pack. As shown, the battery module 100 includes a plurality of battery cells 102 secured within a housing 103, which can include, for example, upper and lower battery holder frames 103a, 103b and a chassis 103c. The aforementioned lead plates 110, 111 are also secured to the housing 103, for example secured to the first and second battery holder frames 103a, 103b. A control module 114 is also secured to the chassis 103c and is shown as partially forming a face of the battery module 100. The control module 114 can include electronics for controlling charging and discharging of the battery cells 102 and interfacing with external equipment, such as solar panels. The control module 114 is also shown as including a plurality of ports and jacks 114a for accomplishing such purposes.

A first cover 108 and a second cover 109 are also provided and are respectively positioned over the holder frames 103a, 103b to enclose the battery module 100 in cooperation with the holder frames 103a, 103b and the chassis 103c. Fasteners 101, such as screws or bolts, extend between the covers 108, 109 to secure the assembly together. In the example shown, the first and second covers 108, 109 are configured to act as heat sinks for the battery module 100 such that heat can be dissipated away from the battery cells 102. To that end, the first and second covers 108, 109 can be provided with a plurality of fins 108a, 109a to aid in heat dissipation. In some examples, the covers 108, 109 can be integrated with cold plates, for example, liquid cooled cold plates. Other devices, such as heat pipes could be integrated as well. In addition to cooling the battery module 100, cold plate designs could be used to heat the battery module 100 with warmed coolant in colder climates or conditions.

Figure 2:
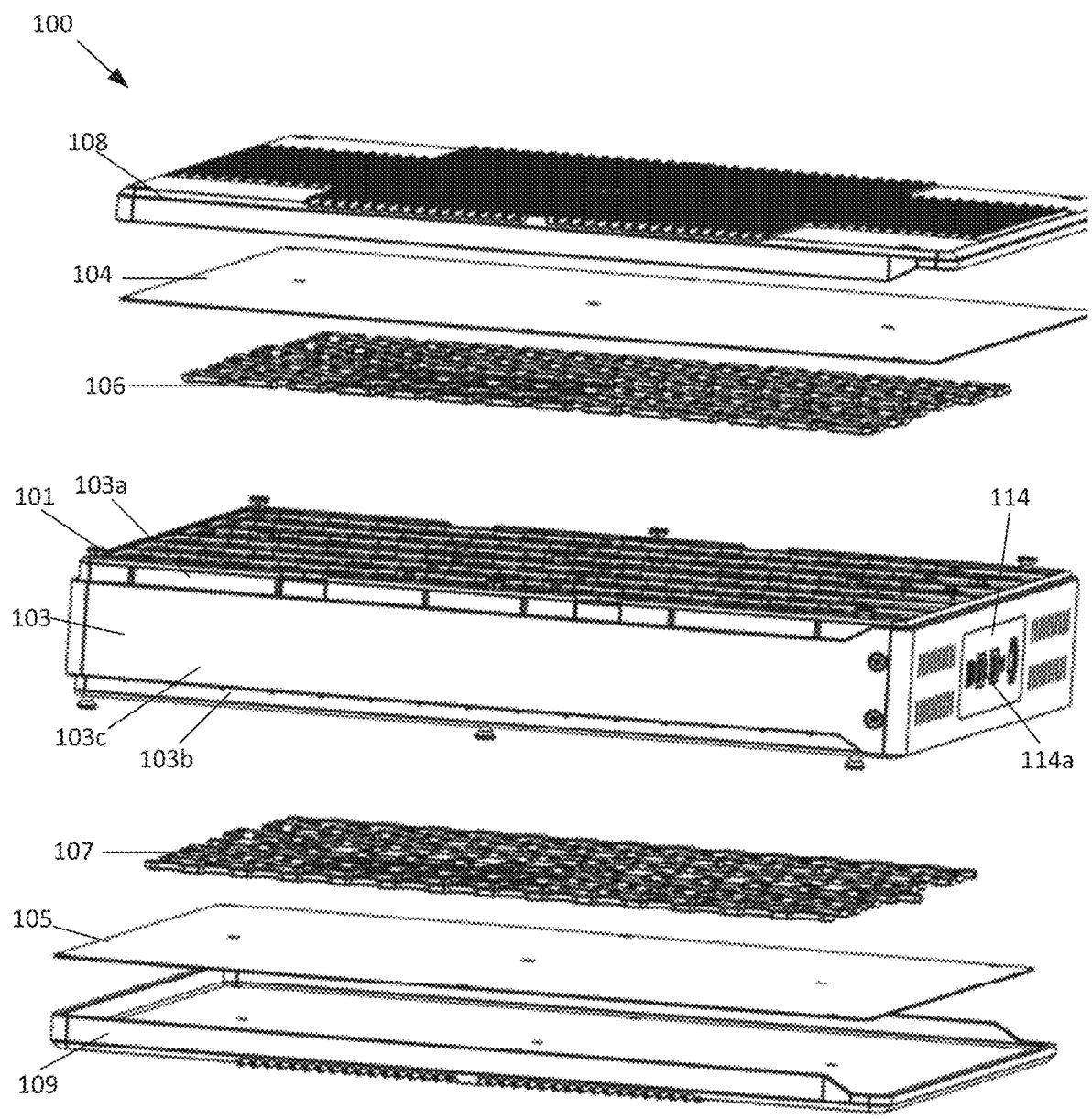
FIG. 2 is an exploded perspective view of the battery module of FIG. 1.
Figure 3:
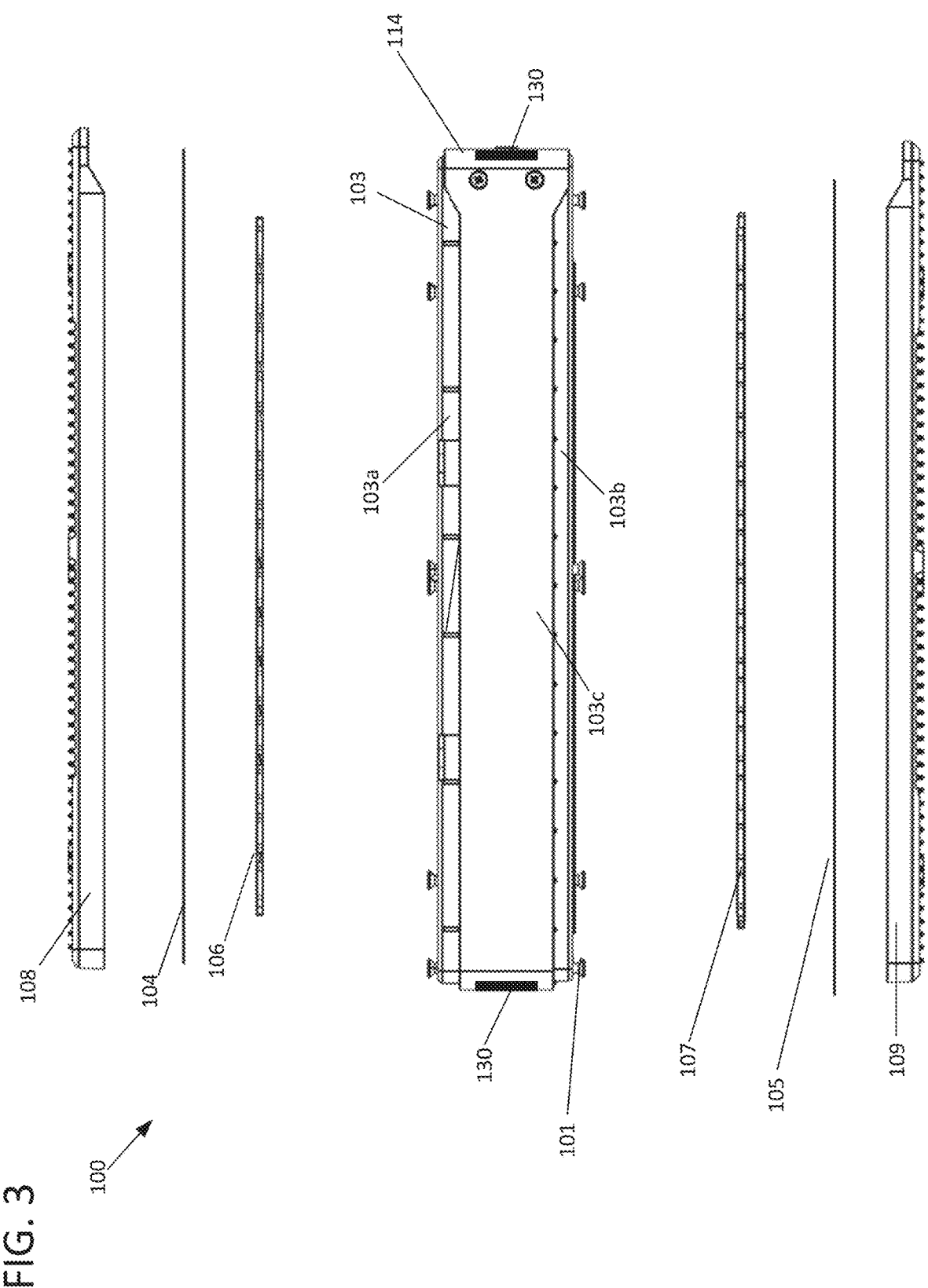
FIG. 3 is an exploded side view of the battery module of FIG. 1.

With reference to FIGS. 2 to 4, and as mentioned previously, the battery module 100 can be further provided with electrically isolating, thermally conductive layers 104, 105, 106, 107 that allow for heat to be transferred from the battery cells 102 to the covers 108, 109. Immediately adjacent to the covers 108, 109 are thin thermally conductive layers or first thermally conductive pads 104, 105. In one example, the first thermally conductive pads 104, 105 are respectively adhered to the covers 108, 109 by an adhesive. In one example, the first thermally conductive pads 104, 105 are solid sheets. The first thermally conductive pads 104, 105 satisfy the voltage requirement for separating the lead plates 110, 111 from the grounded covers 108, 109.

The layers or second thermally conductive pads 106, 107 are provided as a plurality of separate pads adhered to the lead plates 110, 111, for example by an adhesive. In contrast to the first thermally conductive pads 104, 104, the second thermally conductive pads 106, 107 are provided with cutouts which allow for optimized contact with the lead plates 110, 111 while ensuring that the gas vents at the positive end of the battery cells 102 remain free and unblocked. Accordingly, the shaping of the second thermally conductive pads 106, 107 creates gas-venting channels 112, 113 that extend along the length of the lead plates 110, 111. Accordingly, any gas venting from a positive terminal of a battery cell 102 can travel along the length of the gas-venting channels 112, 113, partially defined by the thermally conductive pads 104, 106, to the end of the plates 110, 111.

Figure 5:
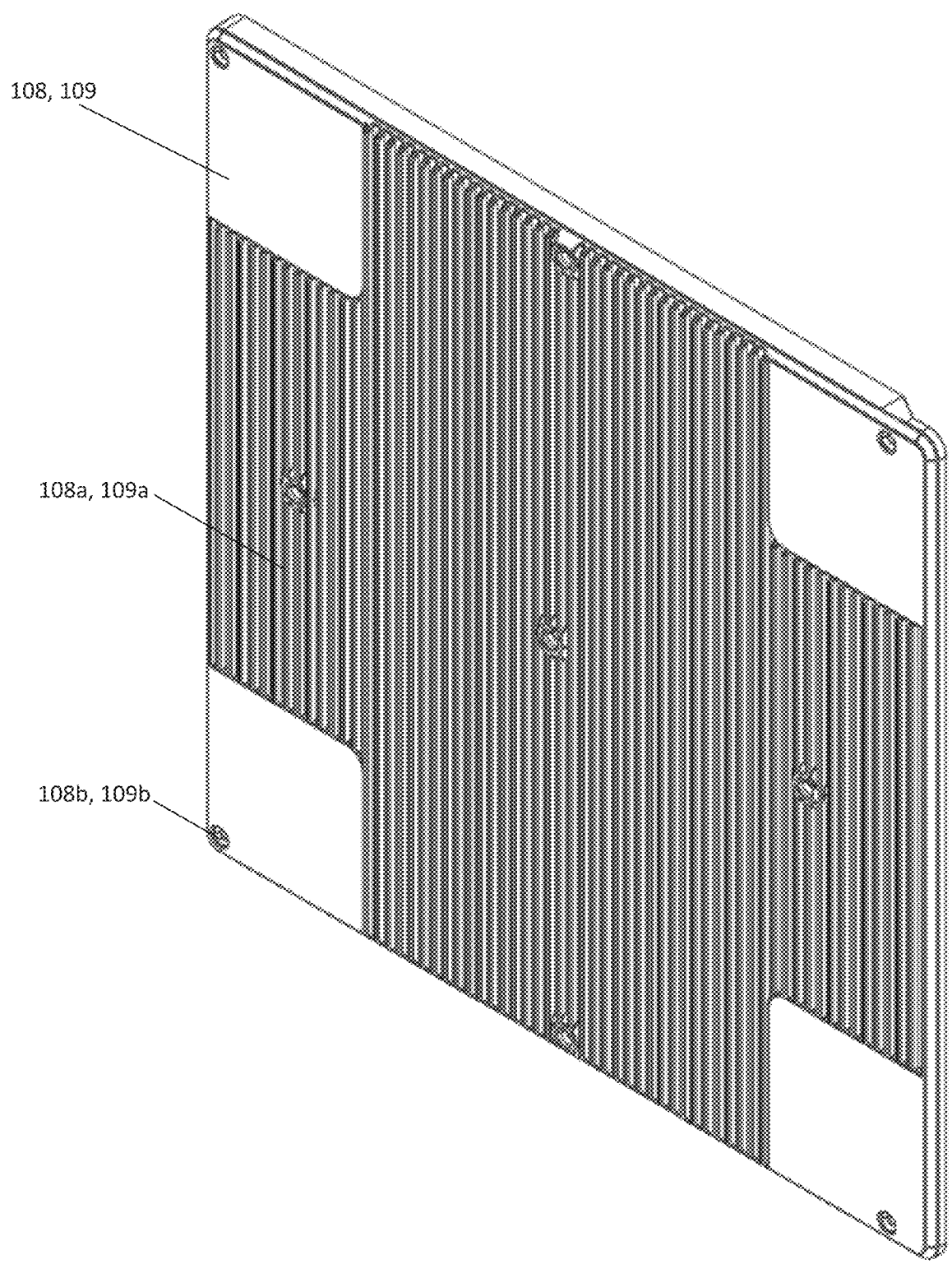
FIG. 5 is a perspective view of a battery module cover of the battery module of FIG. 1.
Figure 6:
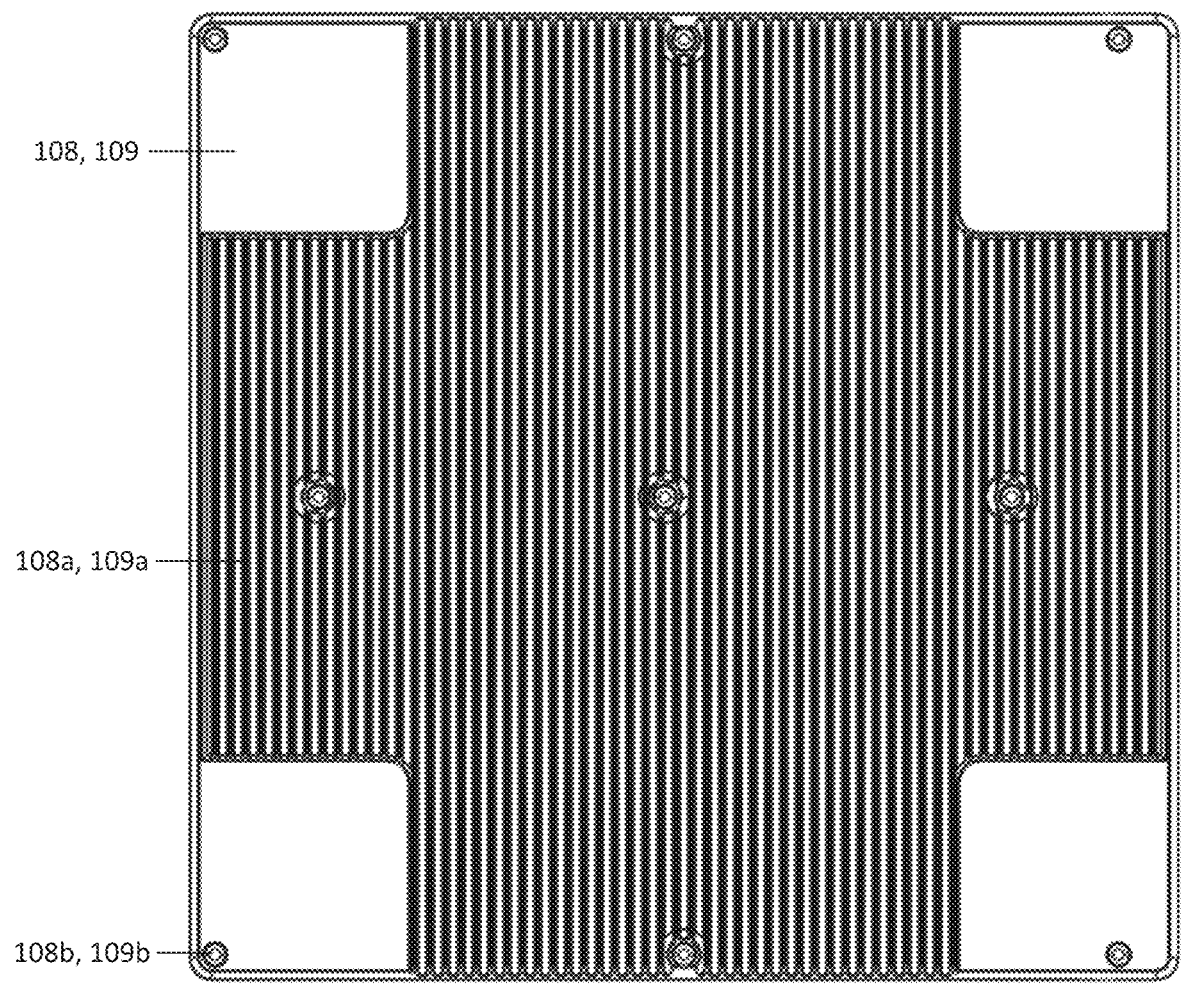
FIG. 6 is a top view of the battery module cover of FIG. 1.
Figure 7:
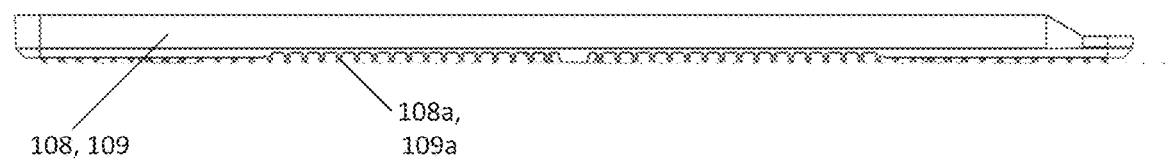
FIG. 7 is a side view of the battery module cover of FIG. 6.

With reference to FIGS. 5 to 7, an example heat sink cover 108, 109 is shown in isolation. In the example shown, the covers 108, 109 are cast aluminum and are provided with fins 108a, 109a for improving heat dissipating performance.

In one aspect, the thickness of the heatsink covers 108, 109 add rigidity and structural safety to the battery module 100. The heatsink covers 108, 109 are also shown featuring a plurality of holes 108b, 109b for receiving fasteners 101 for bolting the battery module 100 together.

Figure 6A:
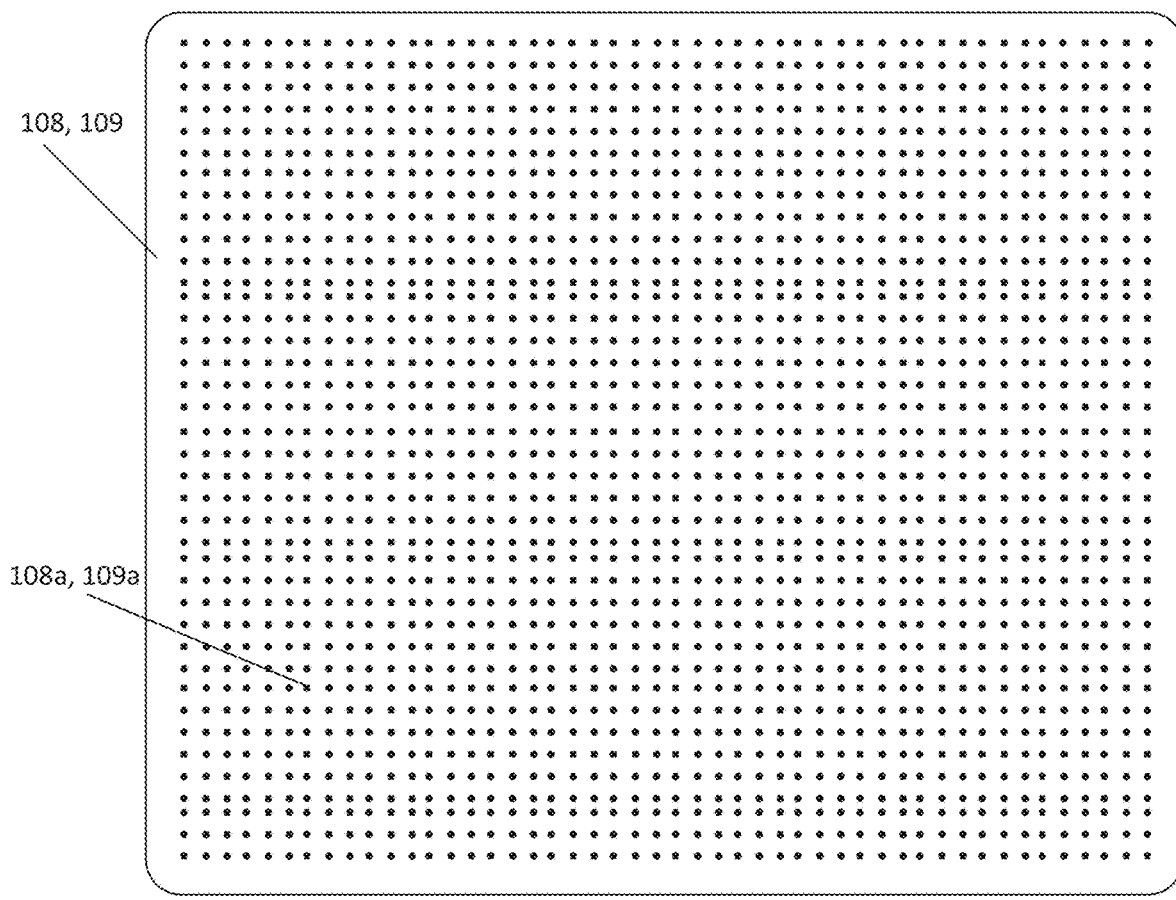
FIG. 6A is a top view of the battery module cover of FIG. 6, with an alternative fin design.
Figure 6B:
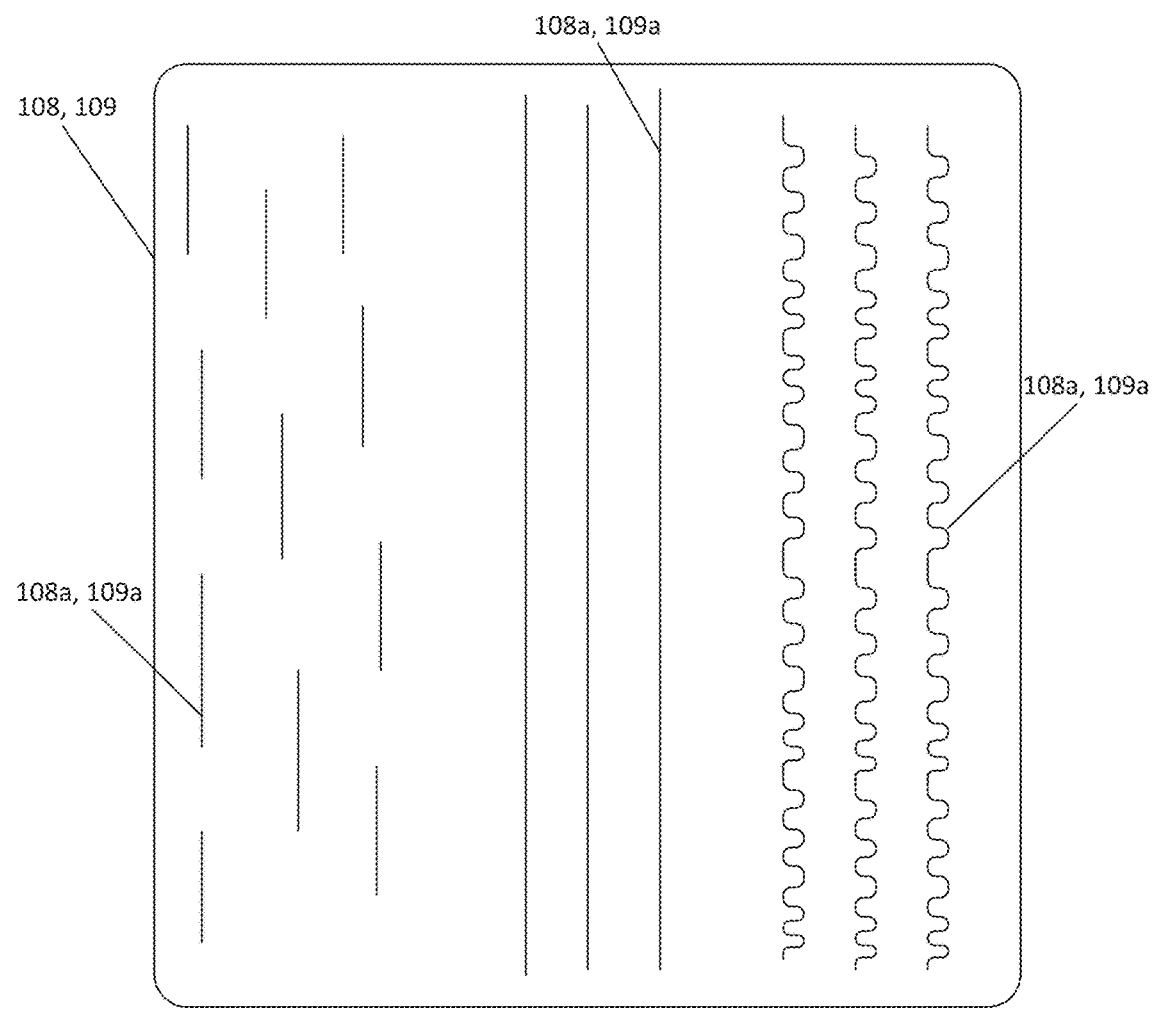
FIG. 6B is a top view of the battery module cover of FIG. 6, with an alternative fin design.

FIGS. 6A and 6B show alternative fin arrangements in which the fins 108a, 109a can be provided in a different pattern and/or configuration. In FIG. 6A, the fins 108a, 109a are provided as a plurality of independent projections extending from the covers 108, 109. In FIG. 6B, the fins 108a, 109a are shown as moving from left to right on the page, interrupted fins, linear fins, and/or textured fins. Combinations of different fin types can be used on the same cover 108, 109. In some examples, forced ventilation across the fins (e.g. See FIG. 26) and mist cooling or other methods may be used to increase heat transfer from the fins 108a, 109a. In some embodiments, the covers 108, 109 and fins may wrap around the cell array to form the entire enclosure in a clamshell form as illustrated. In some embodiments, the fin array may be replaced by a metallic folded fin array; metallic fins pressed, fused, bonded, or welded to the surfaces of the case; or pressed between adjacent battery modules 100. The use of compliant metallic fins may allow a reduction in spacing between modules, allowing for an increase in energy density of the product or device while still maintaining sufficient cooling. In some embodiments, the tips of fins 108a, 109a may be rounded or otherwise shaped so the assembly is comfortable to hold and affords a secure grip.

In some embodiments the covers 108, 109 may be fabricated from materials other than a metal material. For example, the covers 108, 109 may be made of a polymer and formed by a low-cost method, such as injection molding or compression molding. They may be made of an engineering resin such as ABS, polycarbonate, or nylon, or more exotic resins such as polyetherimide in special cases. Heat transfer may be increased by filling the polymer with fiber or filler with a bulk thermal conductivity higher than that of the base resin.

Figure 8:
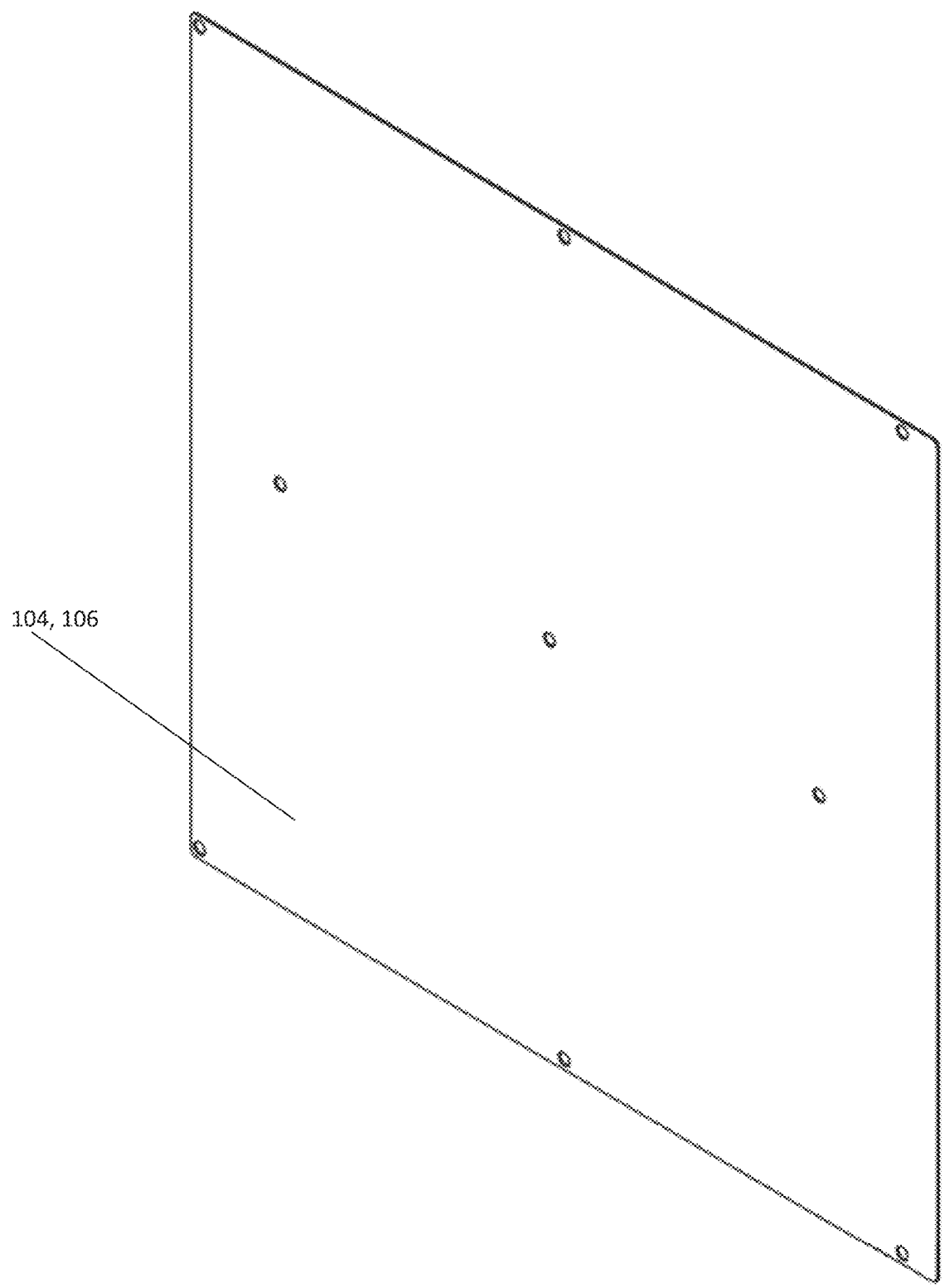
FIG. 8 is a perspective view of a first thermally conductive pad of the battery module of FIG. 1.
Figure 9:
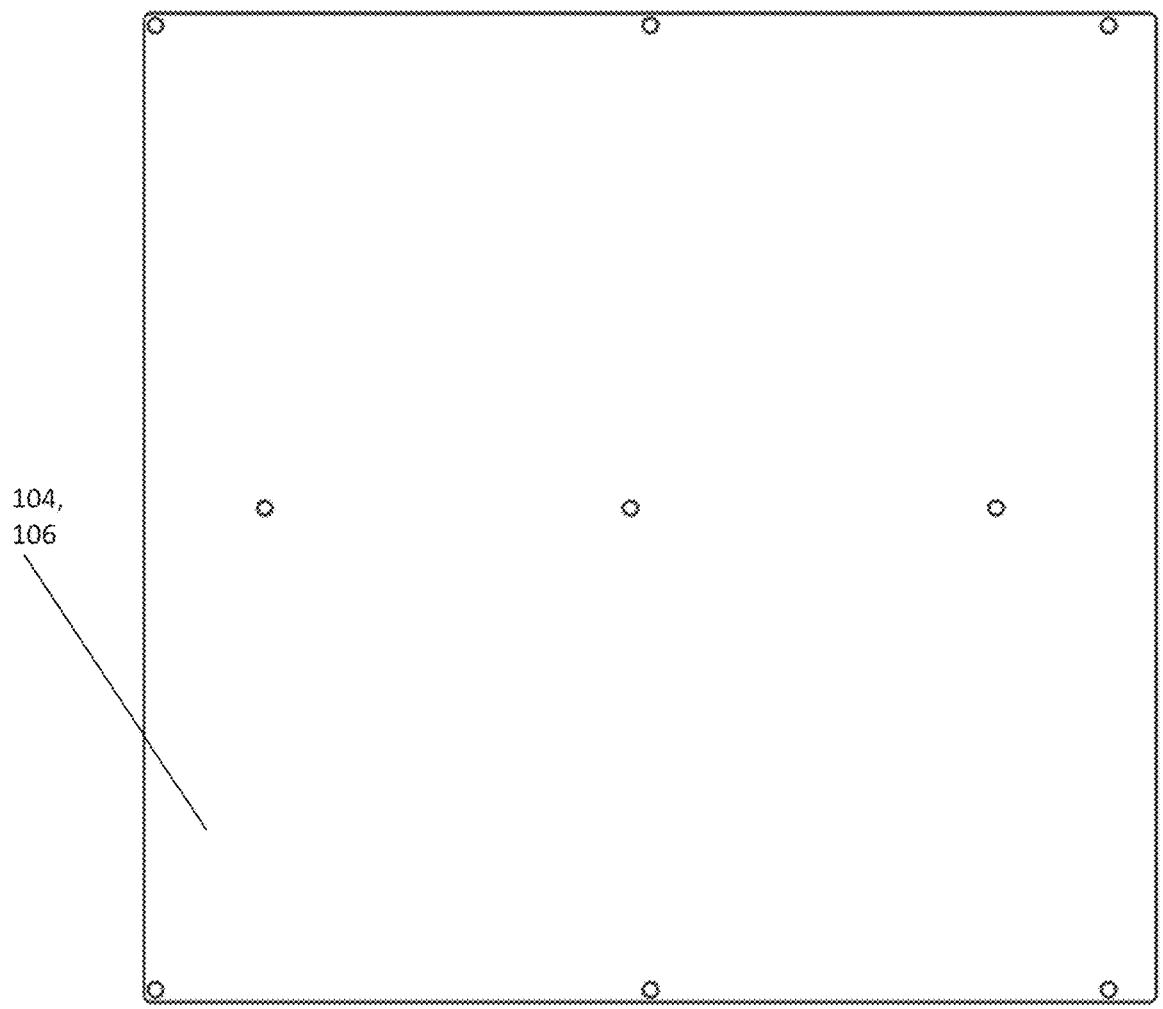
FIG. 9 is a top view of the first thermally conductive pad of FIG. 8.
Figure 10:
FIG. 10 is a side view of the first thermally conductive pad of FIG. 8.

FIGS. 8 to 10 show the first thermally conductive pads 104, 105 in isolation. As mentioned previously, the first thermally conductive pads 104, 105 can be formed as solid sheets and respectively adhered to the covers 108, 109 by an adhesive. Although a solid sheet is shown for the pads 104, 105, other configurations are possible. For example, a pad with cutout portions or apertures may be provided. Also, multiple smaller pads, for example, strips of thermal padding, may be used. Where multiple portions are used, the portions may be immediately adjacent to each other such that a complete covering of the cover surface is achieved, or the portions may be spaced apart from each other such that one or more gaps result. The first thermally conductive pads 104, 105 may also be attached to the covers 108, 109 via other means besides an adhesive. Alternatively, the first thermally conductive pads 104, 105 can be attached to the second thermally conductive pads 106, 107, for example by an adhesive. The first thermally conductive pads 104, 105 can also be simply compressed between the covers 108, 109 and the second thermally conductive pads 106, 107 without being physically attached to either. In the example shown, the thermally conductive pads 104, 105 have a thickness of about 0.2 to 0.5 mm. In the example shown, the pads 104, 105 are formed from "Thermally Conductive Silicone Interface Pads" provided by 3M of St. Paul, Minn., or a similar silicone-based elastomer product having high thermal conductivity and electrically insulating properties, which can be referred to as a "sil pad." In one example, one or both of the pads 104, 105 is a 3M "Thermally Conductive Silicone Interface Pad 5519" having a thermal conductivity of about 4.9 W/m-K, a volume resistivity of about $1.7 \times 10^{14}$ Ohms, and a Shore 00 hardness of 70.

FIGS. 11 to 21 show the second thermally conductive pads 106, 107 in isolation. As mentioned previously, the second thermally conductive pads 106, 107 can be adhered to the lead plates 110, 111 by an adhesive. The second thermally conductive pads 106, 107 may also be attached to the lead plates 110, 111 via other means besides an adhesive. Although multiple separate pad portions are shown, a continuous sheet with cutout portions can also be used to form each of the second thermally conductive pads 106, 107. Alternatively, the second thermally conductive pads 106, 107 can be attached to the first thermally conductive pads 104, 105, for example by an adhesive. The second thermally conductive pads 106, 107 can also be simply compressed between the lead plates 110, 111 and the first thermally conductive pads 104, 105 without being physically attached to either. In the example shown, the second thermally conductive pads 106, 107 have a thickness of about 3 mm. In the example shown, the pads 106, 107 are formed from "Thermally Conductive Silicone Interface Pads" provided by 3M of St. Paul, Minn., or a similar silicone-based elastomer product having high thermal conductivity and electrically insulating properties, which can be referred to as a "sil pad." In one example, one or both of the pads 106, 107 is a 3M "Thermally Conductive Silicone Interface Pad 5519" having a thermal conductivity of about 4.9 W/m-K, a volume resistivity of about $1.7 \times 10^{14}$ Ohms, and a Shore 00 hardness of 70.

In some examples, the first and second thermally conductive pads 104, 105 and 106, 107 are formed from the same material. In other examples, the first and second pads 104, 105 and 106, 107 can be formed from different materials. In some examples, the features of the first and second pads 104, 106 and 105, 107 are integrated into a single pad. In some examples, the pads 104, 105, 106, 107 are provided with an adhesive backing. In some examples, a sprayed or otherwise applied coating can be provided instead of the pads 104, 105, 106, 107.

Figure 11:
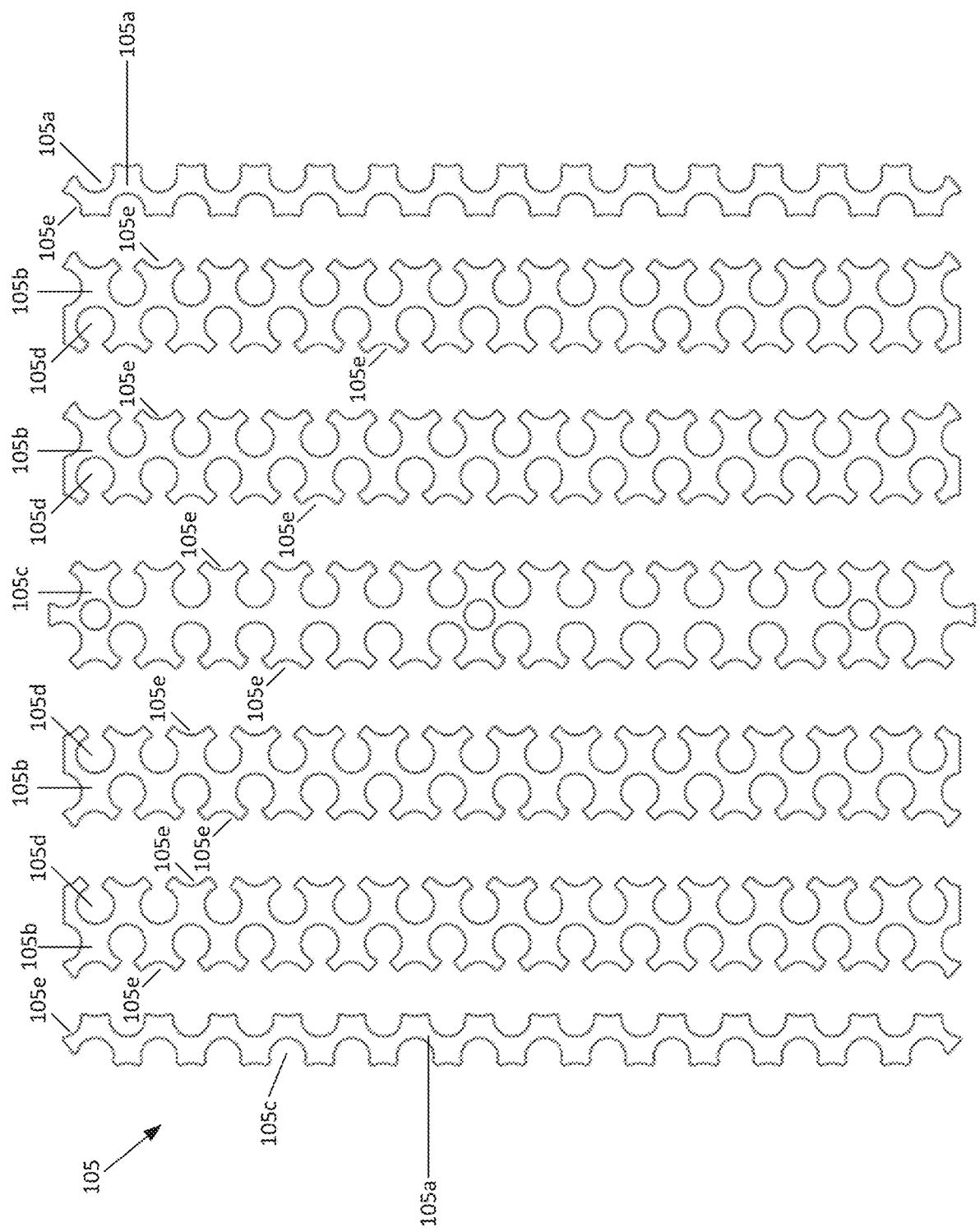
FIG. 11 is a top view of second thermally conductive pads associated with a first side of the battery module of FIG. 1.
Figure 12:
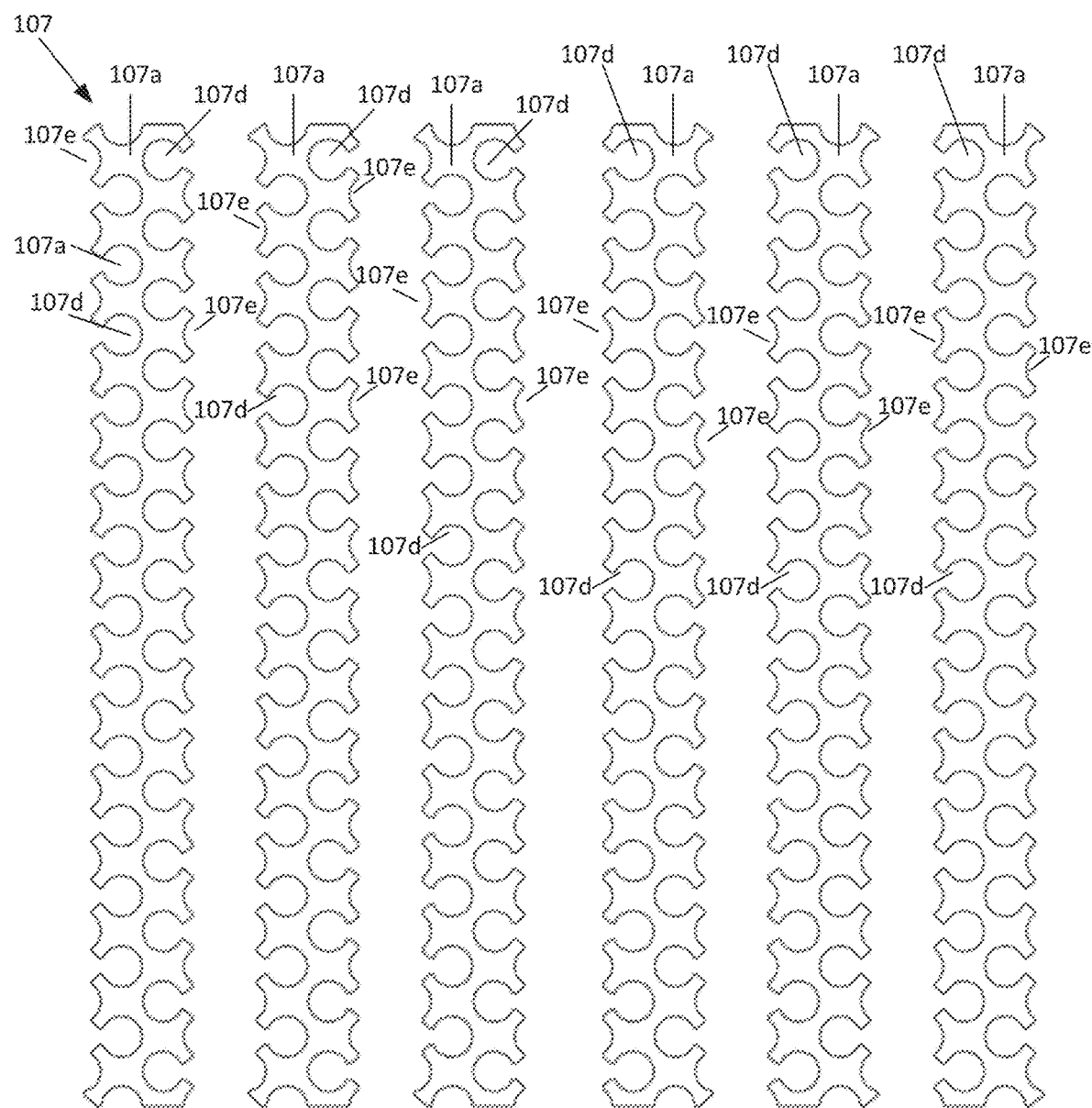
FIG. 12 is a top view of second thermally conductive pads associated with a second side of the battery module of FIG. 1.
Figure 13:
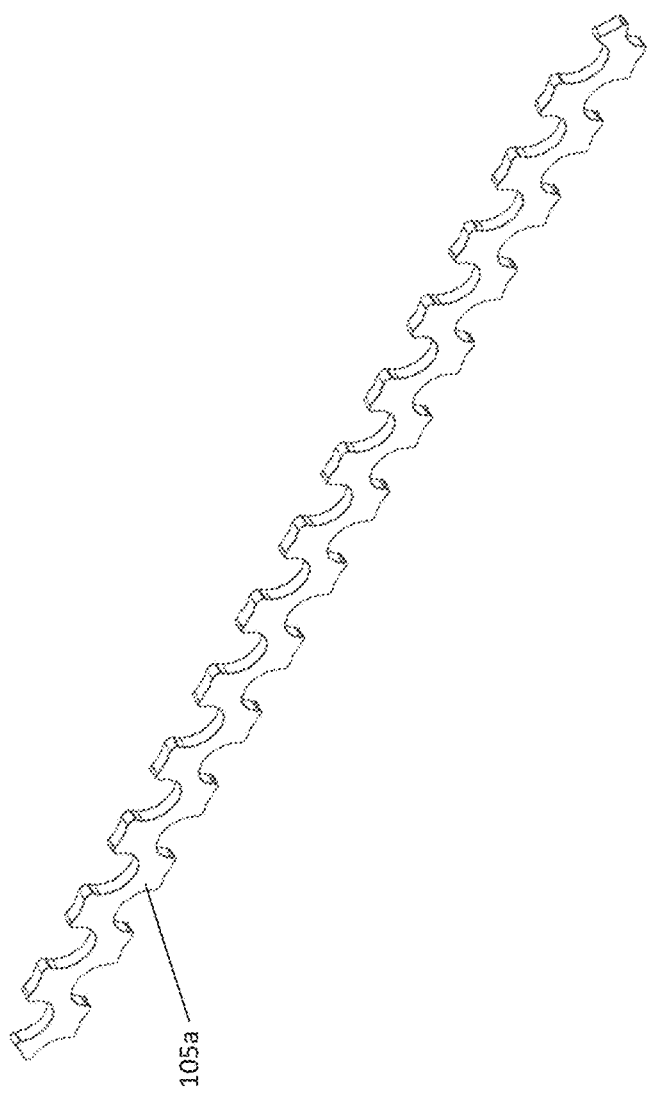
FIG. 13 is a perspective view of a first configuration of a second thermally conductive pad of the battery module of FIG. 1.
Figure 14:
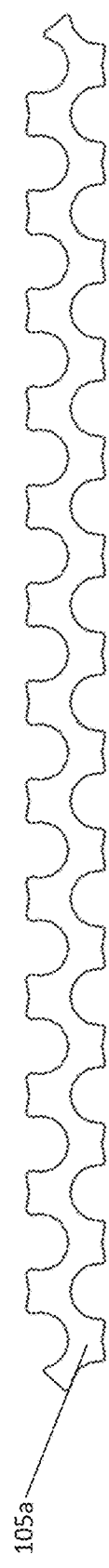
FIG. 14 is a side view of the second thermally conductive pad of FIG. 13.
Figure 15:
FIG. 15 is a top view of the second thermally conductive pad of FIG. 13.
Figure 16:
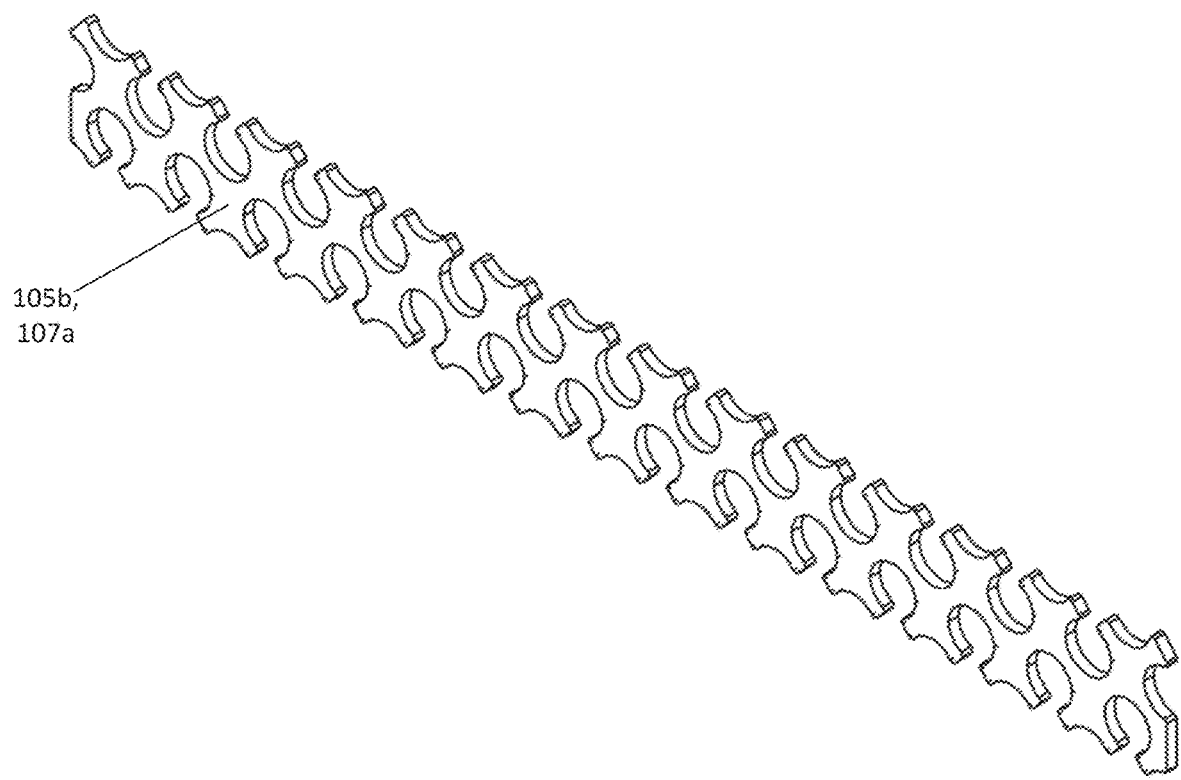
FIG. 16 is a perspective view of a second configuration of a second thermally conductive pad of the battery module of FIG. 1.
Figure 17:
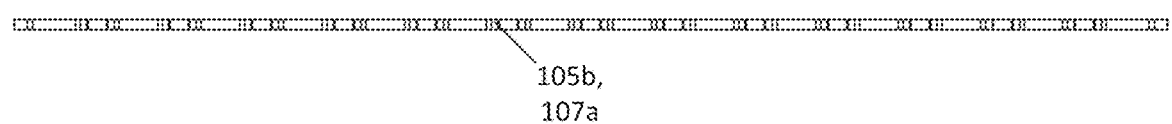
FIG. 17 is a side view of the second thermally conductive pad of FIG. 16.
Figure 18:
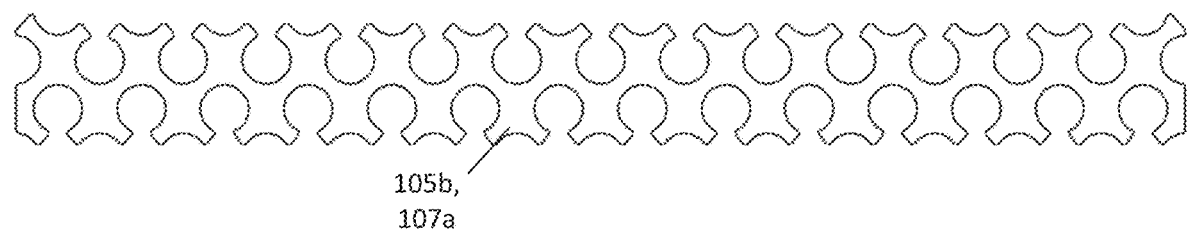
FIG. 18 is a top view of the second thermally conductive pad of FIG. 16.
Figure 19:
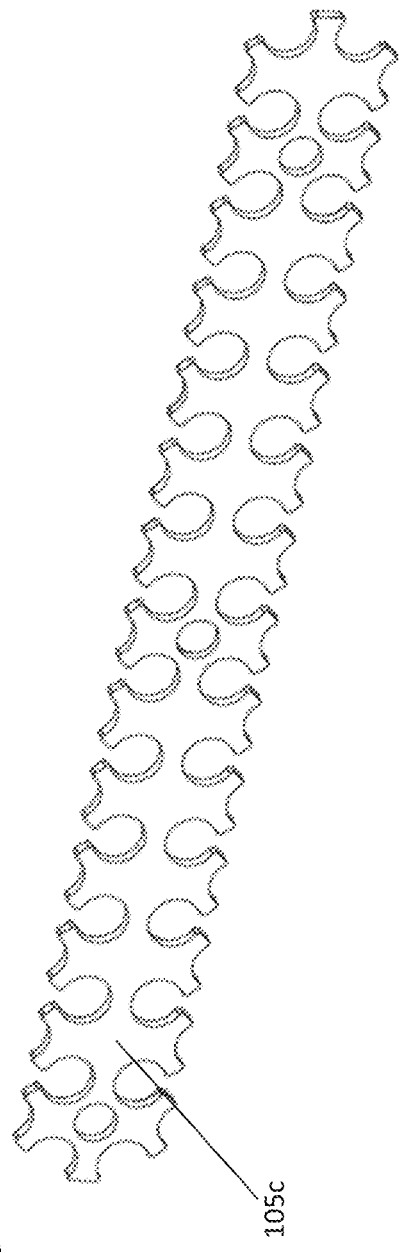
FIG. 19 is a perspective view of a third configuration of a second thermally conductive pad of the battery module of FIG. 1.
Figure 20:
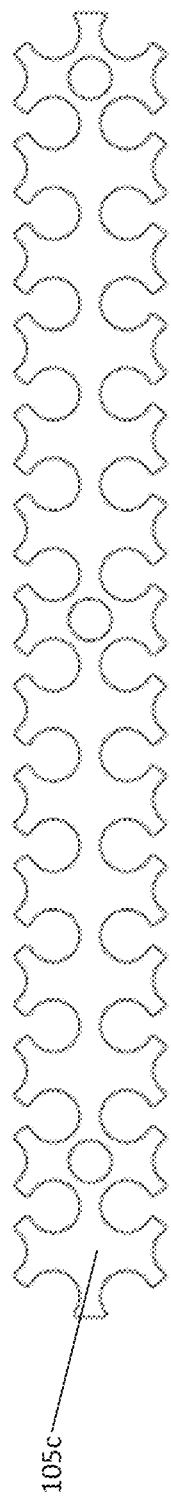
FIG. 20 is a side view of the second thermally conductive pad of FIG. 19.
Figure 21:
FIG. 21 is a top view of the second thermally conductive pad of FIG. 19.

Referring to FIG. 11 specifically, it can be seen that the second thermally conductive pads 105, 107 can include multiple, spaced apart individual pads 105, 107 that have different shapes. For example, the thermally conductive pads 105 include a first pad configuration 105a, a second pad configuration 105b, and a third pad configuration 105c. The pad configurations 105a, 105b, 105c are provided in their respective shapes in order to cover as much of the surface area of the lead plates 110, 111 as possible within the physical constraints defined by the battery module 100 and the frame 103a in particular. Referring to FIG. 12, the thermally conductive pads 107 are shown as including only a first configuration 107a that is generally the same as the pad configuration 105b. Although seven individual pad portions for pads 105 and six individual pad portions for pads 107 are shown, more or fewer pad individual portions can be provided. As shown, the pad configuration 105a allows for the venting of an array with two columns or rows of battery cells 102 while the pad configurations 105b, 105c, 107a allow for the venting of an array with four columns or rows of battery cells 102. Other configurations are possible.

In one aspect, the pads 105, 107 are respectively provided with cutout portions 105c, 105d, 105e and cutout portions 107d, 107e. These cutout portions 107d, 107e provide an opening space above the ends 102b of the battery cells 102 such that any gasses vented from the battery cells 102 can enter into the cutout portions 107d, 107e and escape through the resulting venting passageways or channels 112, 113 defined between the individual pads 105, 107. The venting passageways or channels 112, 113 are shown schematically at FIG. 4 and also at FIGS. 22 and 23, where it can be seen that the passageway or channel 112, 113 is defined by the pads 104, 105 on one side and between the pads 105, 107. In one aspect, the cutout portions 105c, 105d, 105e, 107d, 107e have a general arc shape and form a portion of a circle with an open side facing into the venting passageways or channels 112, 113. As shown, the cutout portion 105c has an arc length that is slightly greater than the circumference of a circle, the cutout portions 105d, 107d have an arc length significantly greater than half the circumference of a circle, and the cutout portions 105e, 107e have an arc significantly length less than half the circumference of a circle. The arc lengths are typically between 107 degrees and 306 degrees. Regardless of the particular arc length associated with the cutout portions 105c, 105d, 105e, 107d, 107e, each portion has an open side facing, and partially defining, the venting passageways or channels 112, 113 such that any gas vented from a battery cell 102 can enter into the cutout portions 105c, 105d, 105e, 107d, 107e and then be guided into the venting passageways or channels 112, 113. In the example shown, the cutout portions 105c, 105d, 105e, 107d, 107e each correspond to a single battery cell 102. However, the pads 105, 107 could be configured such that the cutout portions 105c, 105d, 105e, 107d, 107e receive vented gases from more than one battery cell 102.

Referring to FIGS. 22 and 23, the second thermally conductive pads 105, 107 are shown in an installed condition, where the gas venting passageways 112, 113 can be more easily viewed. As shown, it can be seen that the frames 103a, 103b define sidewalls 103ad, 103bd, each of which defines one side of a gas venting passageway 112, 113, while one of the second thermally conductive pads 105, 107 defines the opposite side of the gas venting passageways 112, 113, wherein each of the cutout portions 105c, 105d, 105e, 107d, 107e have an open side facing or in fluid communication with the gas venting passageways 112, 113. On the outermost sides of the battery module 100, side edges or walls 119 can form one side of the gas venting passageways 112, 113, with the thermally conductive pads 105, 107 forming the other side. In an alternative arrangement without sidewalls 103ad, 103bd, the gas venting passageways 112, 113 can be defined as the space between the adjacent individual pads 105, 107, as is schematically shown at FIG. 4. When a battery cell 102 vents gas, the gas flows through the openings 110b, 111b in the lead plates 110, 111, into one of the cutout portions 105c, 105d, 105e, 107d, 107e, and into the gas venting passageways 112, 113, thereby allowing for the successful venting of gas from a battery cell 102. Once in the gas venting passageways 112, 113, the gas can then be exhausted through vents 130 in the battery module housing 103. In one example, the gas can flow along the venting passageways 112, 113, then beneath the lead plates 110, 111 via openings 132 in the lead plates 110, 111 and then through the vents 132. The openings 132 can be fully encircled or defined openings in the lead plates 110, 111 or can be gaps 132 between the battery module housing 103 and lead plates 110, 111. With continued reference to FIGS. 22 and 23, it can be seen that the second thermally conductive pads 105, 107 respectively cover a majority of the surface area of the lead plates 110, 111, and collectively cover a majority of the surface area of the major sides of the frames 103a, 103b and the major sides of the battery module 100. With the disclosed configuration, thermal conductivity performance is maximized while still fully maintaining the ability of the battery module 100 to vent battery cells 102 safely.

Figure 24:
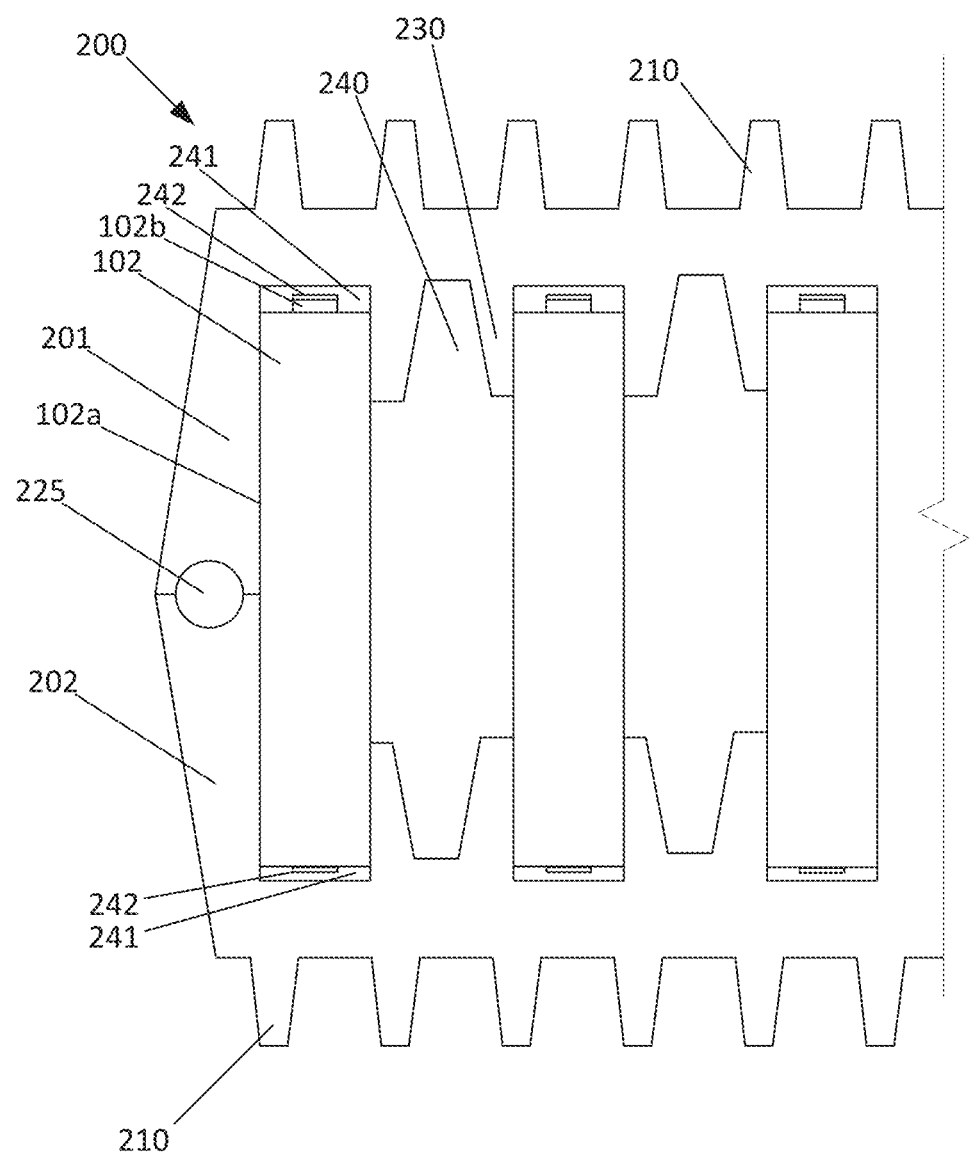
FIG. 24 is a partial cross-sectional view of an alternative configuration for the battery module shown at FIG. 1.
Figure 25:
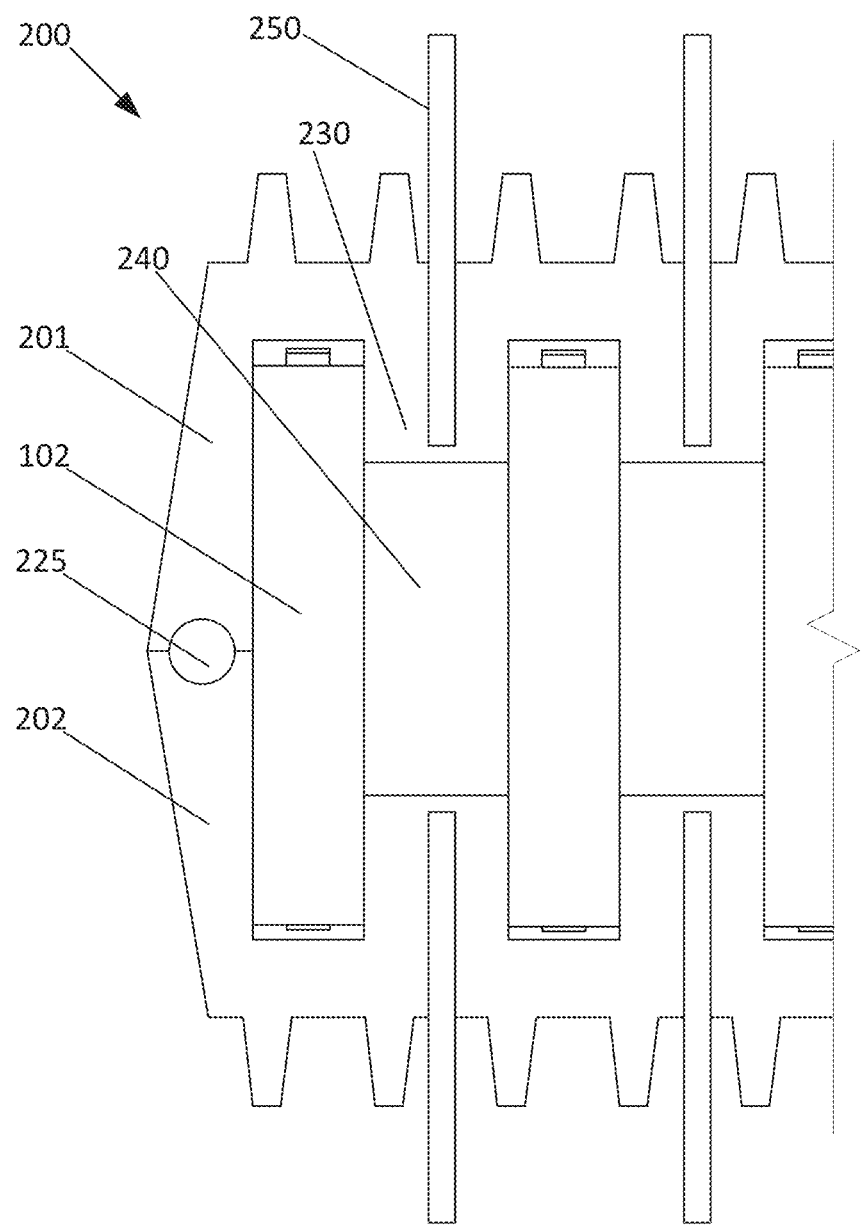
FIG. 25 is a partial cross-sectional view of an alternative configuration for the battery module shown at FIG. 1.

Referring to FIGS. 24 and 25, alternate configurations for a battery module 200 is presented. It is noted that the differing features of the battery module 200 may be incorporated into the battery module 100, and vice versa. FIG. 24 illustrates a cross section view through an example module as outlined in FIG. 1. In one aspect, clamshell-type interface plates 201,202 are provided with pin fins 210, or any of the other types of fins described for fins 108*a*, 109*a*, on their external faces as described above, and enclose an array of battery cells, for example cylindrical 18650 or 21700-type lithium cells 102. The plates may be coupled via a hinge 225. The interface plates are provided with ribs or sockets 230 on their internal faces which securely locate and support the cells, and these features are designed with a suitable level of mechanical interference to provide reliable thermal contact with the large cylindrical faces of the cells, without distorting or crushing the cells 102. Gaps 240 between the sockets may be advantageous to limit thermal communication between the cells, for example to prevent thermal runaway. Additionally, axial gaps 241 at the face of each cell 102 admit metallic cell interconnects 242, which take the form of an interrupted plane shown in cross-section. The interconnects conduct electrical current among the cells 102 in the desired series/parallel configuration. The structure of the array of sockets 230 is interrupted to admit the metallic interconnects 242.

In operation, heat that is generated in the cell and interconnects is transferred through the body of the cell by conduction, further transferred radially outward by conduction to the sockets 230, further transferred axially outward to the planar body of the interface plates by conduction, further transferred into the array of pin fins 210 by conduction, and finally transferred into the surrounding fluid by natural or forced convection. Despite the polymer construction of the interface plates, with appropriate material selection, heat transfer may be significantly enhanced relative to the performance of a less concise heat transfer path.

In some embodiments, thermal performance may be further enhanced by various means, for example by incorporating thermally conductive metallic pins 250 that interpenetrate the interface plates 201, 202, extending from the interior of the module in the spaces between the cells 102, and projecting axially outward into the surrounding fluid. Such an arrangement is shown at FIG. 25. Given the surface area and close proximity to the cell surfaces, the pins may significantly increase heat transfer, while still maintaining high-voltage isolation of the module via the interface plates 201, 202. Pins 250 may be overmolded directly into the interface plates 201, 202 as they are formed, or machine inserted in a subsequent step.

Figure 26:
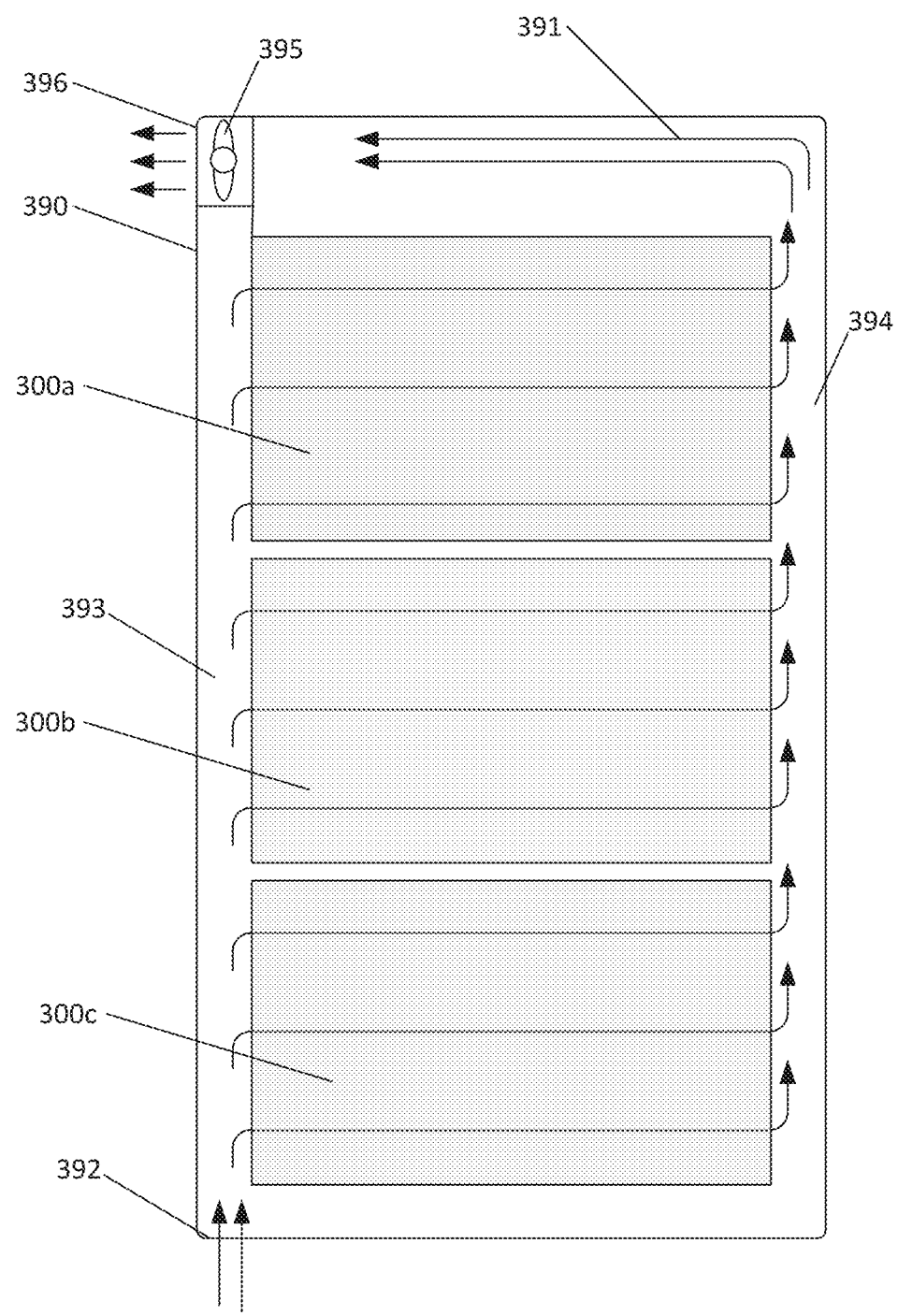
FIG. 26 is a cross-sectional view of a system including an enclosure for holding a plurality of battery modules.
Figure 27:
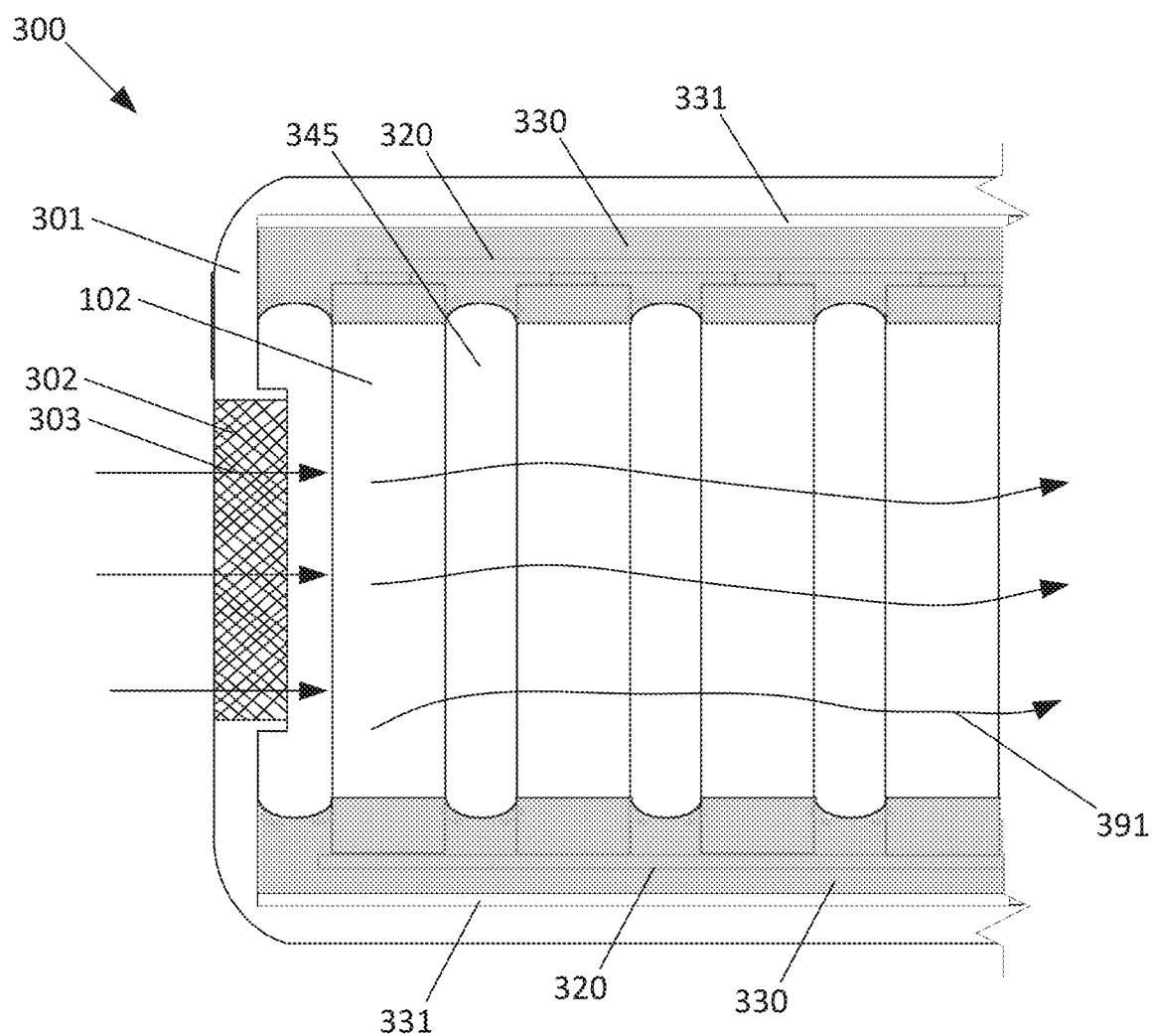
FIG. 27 is a partial cross-sectional view of an alternative configuration for the battery module shown at FIG. 1, usable within the enclosure of FIG. 26.

Referring to FIGS. 26 and 27, an alternate configuration for the battery module 300 and a cabinet 390 for storing multiples of a battery module 300 are presented. FIG. 26 illustrates a front view of an energy storage battery device or product 300 with enhanced thermal performance, comprising enclosure 390, which houses three battery modules 300 (300*a*, 300*b*, 300*c*). In one embodiment, the battery module 300 is cooled by a flow of air illustrated by arrows 391. The air enters via inlet 392 which communicates with inlet plenum 393, which distributes the flow among battery modules 300, etc. The air flows are indicated by arrows 391 throughout the enclosure 390. The arrows 391 indicate that air flows across the modules 300 and enters outlet plenum 394, where air is collected and urged out of the enclosure by fan 395 via outlet 396. Fan 395 basically creates a pressure differential between an inlet 392 and the outlet 396, causing the air to flow through the enclosure 390. In many cases, the inlet 392 and outlet 396 may be so oriented or protected via baffles, louvers, screens, etc. as to prevent ingress of water, particles, insects, etc. In further embodiments, the fan 395 may operate to draw air into the enclosure 390, creating an airflow opposite to that shown. It is noted that the enclosure 390 could include multiple inlets 392 and can be configured to hold more or fewer battery modules 300. The enclosure can also house multiples of the battery modules 100, 200 shown in FIGS. 1-25 to provide for forced-air cooling across the fins to increase cooling capacity.

In some embodiments, the air may flow across one or more surfaces of the modules to cool them by convection, aided in some cases by surface modifications such as fins applied to or between the faces of the modules as described below. In other embodiments, the air may flow through the module itself, flowing across and among the cells and cooling them directly by convection.

The size, position, and shape of the plenums may be chosen so as to limit the fluidic pressure drop along the plenum length, and to concentrate the pressure drop across the modules, such that the flowrate and cooling effect of the flow is equalized among the modules. In one example, where the plenums are on a same end, the gaps between the case and modules may be larger the further the modules are from the inlet 392 and outlet 396 to accomplish such fluidic pressure drop. In some embodiments, the modules may be arranged in multiple layers or ranks in the direction normal to the page of FIG. 26 (e.g. two or three ranks for a total of six or nine modules), with the flow further distributed among the ranks.

FIG. 27 illustrates a cross section view through an example smart battery module 300 utilized in the smart battery product of FIG. 26. The module 300 is enclosed by a protective case 301, which may consist of clamshell-type plates formed from metal or molded from resin. The module 300 is fitted with vents 302 on both ends (one end shown), and the vents may be protected by screens 303, baffles, filters, or other protective means.

The module encloses a multiplicity of battery cells 102, for example cylindrical 18650 or 21700-type lithium cells, with the cells electrically interconnected by interconnects 320 on either end. The electrically active ends of the cells and the metallic interconnects are protected by resin or pottant 330—for instance a flowable thermal adhesive with epoxy, polyurethane, or silicone base chemistry—but the central portion of each cell is exposed to airflow 340 via openings 345. In the case of a metallic case, dielectric sheets 331 on either side may be employed to provide voltage isolation between the cell array and the case.

In operation, heat that is generated in the cells 102 and interconnects 320 is transferred through the body of the cells by conduction, and further transferred by convection into the airflow 340 passing through the module 300 and through openings 345. Even if condensation forms on the cells or if dust is deposited, it cannot corrode or short the contacts, including anodes and cathodes of the cells 102 and corresponding interconnects 320 which are protected by the resin 330. The contacts are basically electrically-active surfaces that are encapsulated in the resin or other suitable pottant.

While FIG. 27 and the corresponding description illustrate and describe the use of a flowable pottant to protect and isolate the electrically-active surfaces, in other embodiments, the assembled module may be dipped or sprayed with an electrically protective resin, for instance of the type commonly used in the manufacture of motor and generator windings, in each case effecting the electrical and environmental protection of the exposed surfaces with respect to the flow of cooling air through the module. In some embodiments, the flowable pottant approach of FIG. 27 may be combined with the finned covers 108, 109 of the type shown at FIG. 1 to form an efficient thermal path.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A battery module comprising:
   a) an enclosure including first and second heat sink covers, each including features for dissipating heat;
   b) a plurality of battery cells positioned between the first and second heat sink covers, and being arranged with alternating polarity such that positive terminals of at least some of the battery cells face the first heat sink cover and such that positive terminals of at least some others of the battery cells face the second heat sink cover;
   c) one or more first lead plates positioned between the first heat sink cover and the plurality of battery cells, the one or more first lead plates being electrically connected with at least some of the battery cells;
   d) a first thermally conductive layer extending between and contacting the one or more first lead plates and the first heat sink cover, the first thermally conductive layer being shaped to at least partially define a gas vent channel extending along a length of the one or more first lead plates, the gas vent channel being in fluid communication with the positive terminals of at least some of the plurality of battery cells.

2. The battery module of claim 1, wherein the first thermally conductive layer includes a first thermally conductive pad in contact with the first heat sink cover and includes a second thermally conductive pad in contact with the first thermally conductive pad and the one or more first lead plates.

3. The battery module of claim 2, wherein the first thermally conductive pad is adhered to the first heat sink cover and the second thermally conductive pad is adhered to the one or more first lead plates.

4. The battery module of claim 2, wherein the first thermally conductive pad is formed of a solid layer.

5. The battery module of claim 4, wherein the second thermally conductive pad defines the gas vent channel.

6. The battery module of claim 2, wherein the second thermally conductive pad has a thickness that is greater than a thickness of the first thermally conductive pad.

7. The battery module of claim 1, wherein the first and second heat sink covers include fins.

8. The battery module of claim 1, further comprising:
   a) one or more second lead plates positioned between the second heat sink cover and the plurality of battery cells, the one or more second lead plates being electrically connected with at least some of the battery cells;
   b) a second thermally conductive layer extending between and contacting the one or more second lead plates and the second heat sink cover, the second thermally conductive layer being shaped to at least partially defining a gas vent channel in fluid communication with the positive terminals of at least some of the plurality of battery cells.

9. The battery module of claim 8, wherein the first and second thermally conductive layers each include a first thermally conductive pad in contact with a second thermally conductive pad.

10. The battery module of claim 9, wherein the first thermally conductive pad of the first thermally conductive layer is in contact with the first heat sink cover and the first thermally conductive pad of the second thermally conductive layer is in contact with the second heat sink cover.

11. The battery module of claim 10, wherein the second thermally conductive pad of the first thermally conductive layer is in contact with the one or more first lead plates and the second thermally conductive pad of the second thermally conductive layer is in contact with the one or more second lead plates.

12. The battery module of claim 9, wherein the first thermally conductive pads of the first and second thermally conductive layers are respectively adhered to the first and second heat sink covers, and wherein the second thermally conductive pads of the first and second thermally conductive layers are respectively adhered to the one or more first and second lead plates.

13. The battery module of claim 9, wherein the first thermally conductive pads of each of the first and second thermally conductive layers are formed of a solid layer.

14. The battery module of claim 9, wherein the second thermally conductive pads of each of the first and second thermally conductive layers define the gas vent channel.

15. The battery module of claim 9, wherein the second thermally conductive pads of each of the first and second thermally conductive layers have a thickness that is greater than a thickness of the first thermally conductive pads of each of the first and second thermally conductive layers.

* * * * *